US012134467B2

(12) United States Patent
Renteria

(10) Patent No.: US 12,134,467 B2
(45) Date of Patent: Nov. 5, 2024

(54) DUAL-STATE ROTATABLE PROPULSION SYSTEM

(71) Applicant: Joseph Raymond Renteria, Baytown, TX (US)

(72) Inventor: Joseph Raymond Renteria, Baytown, TX (US)

( * ) Notice: Subject to any disclaimer, the term of this patent is extended or adjusted under 35 U.S.C. 154(b) by 8 days.

(21) Appl. No.: 18/141,936

(22) Filed: May 1, 2023

(65) Prior Publication Data

US 2023/0356832 A1 Nov. 9, 2023

Related U.S. Application Data

(60) Provisional application No. 63/337,775, filed on May 3, 2022.

(51) Int. Cl.

*B64C 27/08* (2023.01)
*B64C 27/14* (2006.01)
*B64C 29/00* (2006.01)

(52) U.S. Cl.

CPC .............. *B64C 27/08* (2013.01); *B64C 27/14* (2013.01); *B64C 29/0033* (2013.01)

(58) Field of Classification Search

CPC ...... B64C 27/08; B64C 27/14; B64C 29/0033
See application file for complete search history.

(56) References Cited

U.S. PATENT DOCUMENTS 1,990,606 A 2/1935 Junkers
3,231,221 A 1/1966 Platt
3,578,263 A 5/1971 Gunter et al.
3,884,431 A 5/1975 Burrell
3,900,176 A 8/1975 Everett
5,244,167 A 9/1993 Turk et al.
5,839,691 A 11/1998 Lariviere
6,561,455 B2 5/2003 Capanna
6,896,221 B1 5/2005 Einarsson
7,032,861 B2 4/2006 Sanders et al.
7,281,680 B2 10/2007 Melkuti
7,699,260 B2 4/2010 Hughey
7,753,309 B2 7/2010 Garreau (Continued)

FOREIGN PATENT DOCUMENTS

CN 103640690 A 3/2014
GB 2468787 A 9/2010

OTHER PUBLICATIONS

Boeing, Phantom Swift, Sep. 11, 2013, Internet, http://www.boeing.com/features/2013/09/bds-phantom-swift-09-11-13.page, Chicago, IL.

(Continued)

*Primary Examiner* — Valentina Xavier
(74) *Attorney, Agent, or Firm* — Olav M. Underdal; IDP Patent Services

(57) ABSTRACT

A dual-state propulsion aircraft includes an aircraft fuselage; and at least one dual-state propulsion system, including a fixed nacelle, a rotatable nacelle optionally including a front curved section and rear straight section, mechanical nacelle rotation stops, mechanical shaft rotation stops, a motor, and a thruster with pivotable blades; such that the at least one dual-state propulsion system is rotatable to a first system position configured for horizontal flight and to a second system position configured for vertical flight.

30 Claims, 22 Drawing Sheets

Dual-State Rotatable Propulsion Aircraft 100 110 112 1144 1142 120 135 180

(56) References Cited

U.S. PATENT DOCUMENTS

| | | | |
|---|---|---|---|
| 7,871,035 | B2 | 1/2011 | Arel |
| 8,256,704 | B2 | 9/2012 | Lundgren |
| 8,733,690 | B2 | 5/2014 | Bevirt et al. |
| 8,931,729 | B2 | 1/2015 | Alzu'bi et al. |
| 9,139,299 | B2 | 9/2015 | Lundgren |
| 9,187,174 | B2 | 11/2015 | Shaw |
| 9,272,784 | B2 | 3/2016 | Nelson |
| 9,528,375 | B2 | 12/2016 | Alber |
| 9,567,088 | B2 | 2/2017 | Godlasky et al. |
| 9,643,720 | B2 | 5/2017 | Hesselbarth |
| 9,694,911 | B2 | 7/2017 | Bevirt et al. |
| 9,731,820 | B1 | 8/2017 | Godlasky et al. |
| 12,006,035 | B1 * | 6/2024 | De Paiva ............ B64C 29/0033 |
| 2010/0243820 | A1 | 9/2010 | Lim |
| 2011/0042508 | A1 | 2/2011 | Bevirt |
| 2012/0248259 | A1 | 10/2012 | Page et al. |
| 2014/0008485 | A1 | 1/2014 | Lundgren |
| 2015/0028151 | A1 | 1/2015 | Bevirt et al. |
| 2015/0076284 | A1 | 3/2015 | Chubb et al. |
| 2015/0274289 | A1 | 10/2015 | Newman et al. |
| 2016/0236775 | A1 | 8/2016 | Eshkenazy et al. |
| 2016/0311529 | A1 | 10/2016 | Brotherton-Ratcliffe et al. |
| 2016/0347447 | A1 | 12/2016 | Judas et al. |
| 2021/0371097 | A1 | 2/2021 | Renteria |

OTHER PUBLICATIONS

Karem's Nacelle, Richard Whittle, Breaking Defense, "Tilting Wings, Tilting Tailprop, But Not a Tiltrotor: Karem's FARA Design", Oct. 23, 2019, Internet, https://breakingdefense.com/2019/10/tilting-wings-tilting-tailprop-but-not-a-tiltrotor-karems-fara-design, USA.

* cited by examiner

Dual-State Rotatable Propulsion Aircraft

Dual-State Rotatable Propulsion System

Dual-State Rotatable Aircraft System

DUAL-STATE ROTATABLE PROPULSION SYSTEM

CROSS-REFERENCE TO RELATED APPLICATIONS

This application claims the benefit of U.S. Provisional Application No. 63/337,775, filed May 3, 2022; which is hereby incorporated herein by reference in its entirety.

FIELD OF THE INVENTION

The present invention relates generally to the field of aircraft propulsion systems, and more particularly to methods and systems for propeller-based rotatable propulsion systems for use with vertical take-off and landing aircraft.

BACKGROUND OF THE INVENTION

Many propeller driven vehicles, namely VTOL aircraft have opposing propulsion system requirements for different modes of travel. Almost all propeller driven vehicles would benefit from the ability to alter the pitch of their propeller blades. The ability to change propeller blade pitch allows the propeller to use a smaller pitch angle during vertical flight while using a larger pitch angle for horizontal flight. This results in a vehicle which is able to perform both flight modes efficiently. While many vehicles are able to do this, most designers omit this feature for the sake of cost, complexity and weight. Another common desire is the ability to reposition a propeller so that it is able to be oriented for both vertical and horizontal flight modes. Vehicles with tiltable propellers have the advantage of being able to use their propulsion for both vertical and horizontal flight envelopes. This saves the vehicle from having to carry around dead weight during both flight modes but typically requires the use of tilting mechanisms as well as the actuators to operate those tilting mechanisms. Additionally, to realize the full benefit of repurposing your vertical flight propulsion for horizontal flight you must also change your propeller blade pitch as discussed earlier. This all results in complex, costly and heavy systems which become so burdensome that many designers simply opt to have two separate and dedicated propulsion systems for their VTOL aircraft. While dedicated and separated vertical lift and forward thrust systems have proven to be practical, they will never be as efficient as their more complex counterparts.

Therefore, it is the object of the present invention to provide a simplified method for changing the propeller blade pitch as well as the propeller position for a vehicle propulsion system to accommodate different flight modes and thrust requirements with a minimal amount of complexity and weight. This is accomplished by designing a dual-state propulsion system where one motor is able to provide shaft power, nacelle tilt actuation and propeller blade pitch control all in one simple unit.

As such, considering the foregoing, it may be appreciated that there continues to be a need for novel and improved devices and methods for propeller-based rotatable propulsion systems.

SUMMARY OF THE INVENTION

The foregoing needs are met, to a great extent, by the present invention, wherein in aspects of this invention, enhancements are provided to the existing model of propeller-based rotatable propulsion systems.

In an aspect, a dual-state propulsion aircraft can include:

a) an aircraft fuselage; and b) at least one dual-state propulsion system, which can be connected to the aircraft fuselage, wherein the at least one dual-state propulsion system can include:
   - i. a fixed nacelle;
   - ii. a rotatable nacelle, which can be rotatably connected to the fixed nacelle;
   - iii. a motor, which can be rigidly connected to the rotatable nacelle, wherein the motor comprises a rotatable motor shaft, such that a motor shaft axis of the rotatable motor shaft is configured with a motor deviation angle between a nacelle pivot axis of the rotatable nacelle and the motor shaft axis in a range of 5-85 degrees; and
   - iv. a thruster, which can be connected to an outer end of the rotatable motor shaft;

such that the at least one dual-state propulsion system can be rotatable to a first system position configured for vertical flight, such that a first shaft rotational direction causes a first direction nacelle counterrotation of the rotatable nacelle to a first nacelle position corresponding to the first system position, wherein the first direction nacelle counterrotation is induced by a first propeller torque of the thruster, wherein the first direction nacelle counterrotation is enabled by the motor deviation angle;

such that the at least one dual-state propulsion system can be rotatable to a second system position configured for horizontal flight, such that a reversal of the first shaft rotational direction to a second shaft rotational direction causes a second direction nacelle counterrotation of the rotatable nacelle from the first nacelle position to a second nacelle position corresponding to the second system position, wherein the second direction nacelle counterrotation is induced by a second propeller torque of the thruster, wherein the second direction nacelle counterrotation is enabled by the motor deviation angle.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION

Figure 1A:
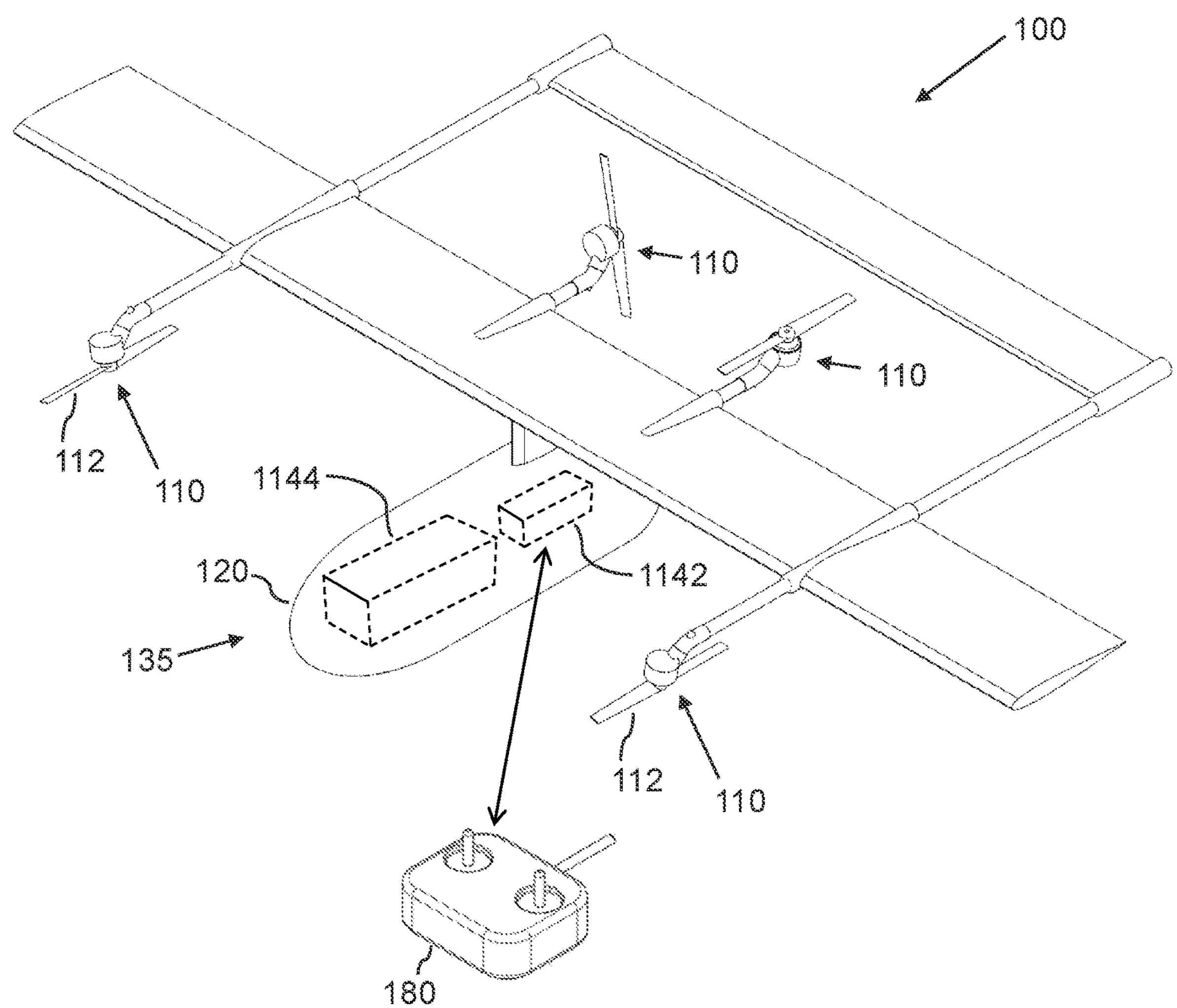
FIG. 1A is a perspective view of a dual-state rotatable propulsion aircraft, according to an embodiment of the invention.
Figure 1B:
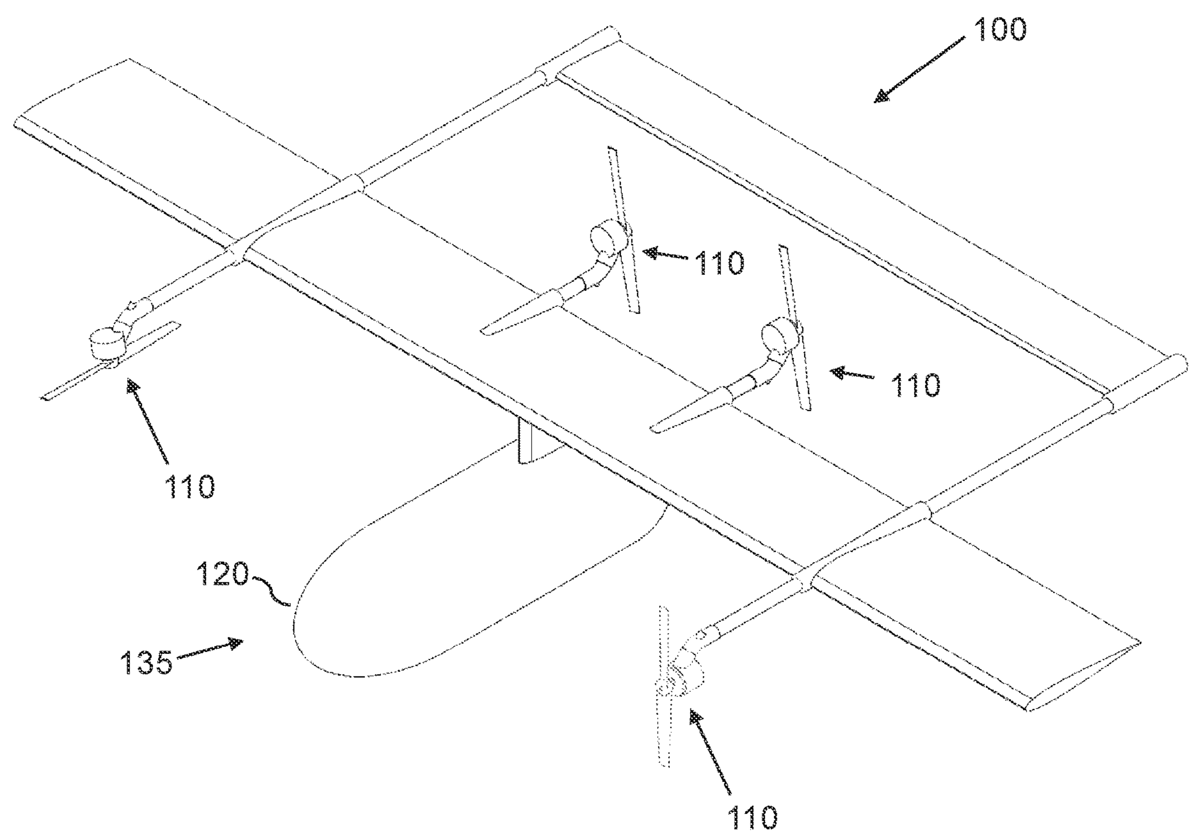
FIG. 1B is a perspective view of a dual-state rotatable propulsion aircraft, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a dual-state rotatable propulsion system 110 with reference to FIG. 1A, which depicts a dual-state rotatable propulsion aircraft 100 mounted with a plurality of dual-state rotatable propulsion system 110; in such manner that like reference numerals refer to like components throughout; a convention that we shall employ for the remainder of this specification.

In various related embodiments, the dual-state rotatable propulsion system 110 can be configured such that:

a) The dual-state rotatable propulsion system 110 can be driven directly by the motor shaft such that reversal of motor shaft direction controls nacelle rotation (driven indirectly by propeller torque) and propeller pitching of the dual-state rotatable propulsion system 110;

b) The dual-state rotatable propulsion system 110 can be configured with a free spinning hub, which allows the shaft to rotate relative to the hub and blades. When the motor reverses, the thrust is also reversed which is compensated for by reorienting the nacelle. Further, the blades can have a finer pitch position for vertical flight and a coarser pitch position for horizontal flight; and c) Mechanical stops are used to control the binary rotatable positioning of the nacelle and the binary pitch positioning of the hub and propeller blades.

In various further related embodiments, a blade pitch mechanism of a hub assembly of dual-state rotatable propulsion system 110 can be configured such that:

a) The hub spins freely around the shaft;

b) The shaft itself is what actuates the prop pitching mechanism;

c) The blades have only two binary operating positions; and d) Thrust direction is reversed when the shaft rotation is reversed.

In a plurality of embodiments, the dual-state rotatable propulsion system 110 relates generally to a propulsion system for propeller driven vehicles. The propulsion system has two states of operation where the state of operation is determined by the rotational direction of a propeller/motor shaft 303, which can also be referred to as a motor shaft 303 or propeller shaft 303, which is the final rotational power delivery from the electric motor 214, after any intervening gearing. Ideally, the propeller/motor shaft is electrically driven and can be easily reversed so as to change the state of the dual propulsion system. The two propeller/motor shaft rotational directions will thereby provide the system with two separate modes of operation, where the propeller thrust direction and propeller/motor shaft orientation are controlled by the propeller/motor shaft rotational direction. The propeller of the dual-state propulsion system is able to produce thrust in both directions depending on the rotational direction of the propeller/motor shaft. The propeller/motor shaft of the dual-state propulsion system is mounted to a pivoting nacelle which rotates freely around a nacelle pivot axis within a mechanically limited range of motion. When the propeller/motor shaft is rotating in a first direction the propeller produces thrust in a first direction and the nacelle is induced to rotate to a first position by propeller blade thrust and/or propeller/motor shaft torque. When the propeller/motor shaft is rotating in a second direction the propeller produces thrust in a second direction and the nacelle is induced to rotate to a second position by propeller blade thrust and/or propeller/motor shaft torque.

Thus, in an embodiment, as shown in FIGS. 1A-1C, 2A-2C, 3A-3G, and 9A-9D, a dual-state propulsion aircraft can include:

a) an aircraft fuselage 120; and b) at least one dual-state propulsion system 110, which can be connected to the aircraft fuselage 120, wherein the at least one dual-state propulsion system 110 can include:

i. a fixed nacelle 215, which can be connected to the aircraft fuselage 120 (for example via intermediate structures);

ii. a rotatable nacelle 201, which can be rotatably connected to the fixed nacelle 215, such that a nacelle pivot axis 302 of the rotatable nacelle 201 can be configured with a nacelle deviation angle 372, 972 between a horizontal flight direction 371, 971 and the nacelle pivot axis 302, 902, wherein the nacelle deviation angle 372, 972 can be in a range of 5-85 degrees, 5-45 degrees, or 10-45 degrees, or some other suitable range between 0 and 90 degrees;

iii. a motor 214, which can be rigidly connected to the rotatable nacelle 201, wherein the motor 214 comprises a rotatable motor shaft 303, such that a motor shaft axis 204, 904 of the rotatable motor shaft 303 is configured with a motor deviation angle 374, 974 between the nacelle pivot axis 302, 902 and the motor shaft axis 204, 904;

wherein the nacelle pivot axis 302, 902 and the motor shaft axis 204, 904 are not parallel and not perpendicular;

wherein the motor deviation angle 374, 974 can be in a range of 5-85 degrees, 5-45 degrees, or 10-45 degrees, or some other suitable range between 0 and 90 degrees;

wherein the motor deviation angle 374, 974 can be 90 degrees minus the nacelle deviation angle 372, 972; and iv. a thruster 112, which can be connected to an outer end of the rotatable motor shaft 303;

such that the at least one dual-state propulsion system 110 can be rotatable to a first system position 211*a* configured for vertical flight, wherein the motor shaft axis 204 is parallel to a vertical flight direction 373, such that a first shaft rotational direction 224 causes a first direction nacelle counterrotation 222 of the rotatable nacelle 201 to a first nacelle position 216*a*, 316*a* corresponding to the first system position 211*a*, wherein (i.e. whereby, as a physical consequence) the first direction nacelle counterrotation 222 is induced by a first propeller torque 235 of the thruster 112, wherein the first direction nacelle counterrotation 222 is enabled by the motor deviation angle 374, 974;

such that the at least one dual-state propulsion system 110 can be rotatable to a second system position 211*c* configured for horizontal flight, wherein the motor shaft axis 204 is parallel to a horizontal flight direction 371; such that a reversal of the first shaft rotational direction 224 to a second shaft rotational direction 225 causes a second direction nacelle counterrotation 223 of the rotatable nacelle 201 from the first nacelle position 216*a*, 316*a* to a second nacelle position 216*c*, 316*c* corresponding to the second system position 211*c*, wherein (i.e. whereby, as a physical consequence) the second direction nacelle counterrotation 223 is induced by a second propeller torque 234 of the thruster 112, wherein the second direction nacelle counterrotation 223 is enabled by the motor deviation angle 374, 974.

In various related embodiments, the rotatable motor shaft 303 can be a direct drive shaft 303 or it can be a geared down motor shaft 303 (or in some cases a geared up motor shaft 303), such that the electric motor 214 can include an internal gear mechanism that is connected to a rotatable drive unit, such as an electric engine; wherein the geared down motor shaft 303 is connected to an output axle of the gearing mechanism. In other alternative embodiments, a separate gear assembly may be connected between the geared down motor shaft 303 and the electric motor 214.

In a related embodiment, the nacelle pivot axis of the rotatable nacelle can be configured with a nacelle deviation angle 372, 972 between a horizontal flight direction 371, 971 and the nacelle pivot axis 302, 902, wherein the nacelle deviation angle 372, 972 can be in a range of 5-85 degrees, and wherein the motor deviation angle 374, 974 can be substantially 90 degrees minus the nacelle deviation angle 372, 972, within tolerances due to manufacturing or flexing of aircraft 100 structures;

wherein the motor shaft axis 204 is parallel to a vertical flight direction 373 when the at least one dual-state propulsion system 110 is in the first system position 211*a*; and wherein the motor shaft axis 204 is parallel to a horizontal flight direction 371 when the at least one dual-state propulsion system 110 is in the second system position 211*c*. In alternative related embodiments, the orientation can be shifted upwards or downwards, such that the motor shaft axis 204 can be angled upwards or downwards, relative to the horizontal flight direction 373, when the at least one dual-state propulsion system 110 is in the second system position 211*c*.

In other related embodiments, when a combined angle of the nacelle deviation angle 372, 972 plus the motor deviation angle 374, 974 is not substantially 90 degrees, the at least one dual-state propulsion system 110 can be configured such that is rotatable between a first position that is deviates from a horizontal rotation of the thruster 112 and a second position that is deviates from a vertical rotation of the thruster 112, such as for example with the motor shaft axis 204 angled upwards or downwards, relative to the horizontal flight direction 371.

In another related embodiment, the motor deviation angle 374, 974 can be 45 degrees and the nacelle deviation angle 372, 972 can be 45 degrees, as shown in FIGS. 1A-1C, 2A-2C 3A-3G, and 9A-9D.

In yet a related embodiment, a nacelle rotational span between the first nacelle position 216*a*, 316*a* and the second nacelle position 216*c*, 316*c* can be in a range of 5-180, 10-180, 20-180 degrees, 5-210 degrees, 5-355 degrees, 1-359 degrees, or some other suitable range between 0 and 360 degrees.

In a further related embodiment, the nacelle rotational span between the first nacelle position 216*a*, 316*a* and the second nacelle position 216*c*, 316*c* can be 180 degrees, as shown in FIGS. 1A-1C, 2A-2C and 3A-3G.

In a related embodiment, the at least one dual-state propulsion system can further include:

a) a nacelle axle 213, which can be connected between the fixed nacelle 215 and the rotatable nacelle 201.

In another related embodiment, the fixed nacelle 215 can further include:

a) a front curved section 317; and b) a rear straight section 319;

such that a connection angle 372 between the front curved section 317 and the rear straight section 319 can be configured to be 90 degrees minus the motor deviation angle 374, 974, or some other selected connection angle, for example in a range of 5-90 degrees.

In yet a related embodiment of a dual-state propulsion system 910, as shown in FIGS. 9A-9D, the dual-state propulsion system 910 can be configured such that:

a) the fixed nacelle 915 is configured as a front straight tubular section 917, such that an outer end of the front straight tubular section 917 can be configured with a front angled sectional cut 922; and b) the rotatable nacelle 901 is configured as a rear straight tubular section 919, such that an inner end of the rear straight tubular section 919 can be configured with a rear angled sectional cut 924, which matches the front angled sectional cut 922;

such that the nacelle pivot axis 902 is perpendicular to each of the front angled sectional cut 922 and the rear angled sectional cut 924.

In yet another related embodiment of a dual-state propulsion system 510, as shown in FIGS. 5A-9B, the at least one dual-state propulsion system 510 can further include:

a) a first mechanical stop 522, which can be configured to stop the rotatable nacelle 201 when the rotatable nacelle 201 is in the first nacelle position 316*a*; and b) a second mechanical stop 526, which can be configured to stop the rotatable nacelle 201 when the rotatable nacelle 201 is in the second nacelle position 316*c;* such that the first mechanical stop 522 and the second mechanical stop 526 are configured to allow a nacelle rotation 222, 223 between the first nacelle position 316*a* and the second nacelle position 316*c*.

In a further related embodiment, the at least one dual-state propulsion system 510 can further include:

a) an intermediate flange 524, which can be connected to a side surface of a rear end of the rotatable nacelle 201, such that the intermediate flange protrudes to a rear of the rear end of the rotatable nacelle 201;

wherein the first mechanical stop 522 can be configured as a first flange 522, which is connected to a first side surface of a front end of the fixed nacelle 215, such that the first flange protrudes to a front of the front end of the fixed nacelle; and wherein the second mechanical stop 526 can be configured as a second flange 526, which is connected to a second side surface of the front end of the fixed nacelle 215, such that the second flange 526 protrudes to the front of the front end of the fixed nacelle 215;

such that the intermediate flange 524 impacts with the first flange 522 when the rotatable nacelle 201 is in the first nacelle position 316*a*; and such that the intermediate flange 524 impacts with the second flange 526 when the rotatable nacelle 201 is in the second nacelle position 316*c*.

In an alternative embodiment, the first and second flanges 522, 526 can be connected to the rear end of the of the rotatable nacelle 201 and the intermediate flange can be connected to the front end of the fixed nacelle 215.

In a related embodiment of a dual-state propulsion system 310, as shown in FIGS. 3A-3G and 4A-4C, the thruster 312 of the at least one dual-state propulsion system can further include:

a) a central hub 305, which can be rotatably connected to a front end of the rotatable motor shaft 303, such that the rotatable motor shaft 303 is configured to be freely rotatable in intermediate shaft positions 412*b* between a first shaft position 412*a* and a second shaft position 412*c*, relative to the central hub 305; and b) a first thruster blade 306, which can be pivotably 322, 323 connected to the central hub 305, such that a blade pitch axis 327 of the first thruster blade 306 is perpendicular to a motor shaft axis 204 of the rotatable motor shaft 303, such that the first thruster blade 306 is configured to be pivotable between a first pitch position 402*a* and a second pitch position 402*c*, corresponding to a free rotation of the rotatable motor shaft 303 between the first shaft position 412*a* and the second shaft position 412*c;* such that a first shaft rotation 324 of the rotatable motor shaft 303 in the first shaft rotational direction 324 causes a pivoting of the first thruster blade in a first pitch direction 322 until the first thruster blade 306 reaches the first pitch position 402*a*, wherein the rotatable motor shaft 303 engages with the central hub 305 and causes a rotation of the thruster 312 in the first shaft rotational direction 324; and such that a reversal from the first shaft rotation 324 to a second shaft rotation 325 of the rotatable motor shaft 303 in the second shaft rotational direction 325 causes a second pivoting of the first thruster blade in a second pitch direction 323 until the first thruster blade 306 reaches the second pitch position 402*c*, wherein the rotatable motor shaft 303 engages with the central hub 305 and causes a rotation of the thruster in the second shaft rotational direction 325.

In a further related embodiment, the central hub 305 can further include:

a) a central hub member 330, which can include a first outer aperture 334;

b) a first thruster gear assembly 340, including:

i. a first thruster gear 308, comprising first thruster teeth; and ii. a first thruster axle 342, which is connected to an inner center of the first thruster gear 308, such that the first thruster axle 342 is rotatably connected in the first outer aperture 334 of the central hub member;

such that the first thruster gear 308 is connected to an inner end of the first thruster blade 306, such that a first gear axis 347 of the first thruster gear 308 is coincident with the blade pitch axis 327; and c) a shaft gear 314, which is connected around the rotatable motor shaft 303, such that a shaft gear axis 367 of the shaft gear is coincident with the motor shaft axis 204;

such that the first thruster gear 308 is in intermeshing contact with the shaft gear 314.

In a yet further related embodiment, the central hub member 330 can further include:

a) A longitudinal aperture 338, such that the rotatable motor shaft 303 protrudes through the longitudinal aperture 338;

b) a first shaft mechanical stop member 331 which protrudes on a first outer side of the longitudinal aperture 338; and c) a second shaft mechanical stop member 332 which protrudes on a second outer side of the longitudinal aperture 338; and wherein the thruster 312 can further include:

i. an intermediate shaft mechanical stop member 313, which can be connected to an outer end of the rotatable motor shaft 303, such that the intermediate shaft mechanical stop member 313 protrudes laterally from the rotatable motor shaft 303;

such that the intermediate shaft mechanical stop member 313 can be configured to impact with the first shaft mechanical stop member 331 when the first thruster blade 306 is in the first pitch position 402*a*; and such that the intermediate shaft mechanical stop member 313 can be configured to impact with the second shaft mechanical stop member when the first thruster blade 306 is in the second pitch position 402*c*.

In a further related embodiment, the central hub member 330 can further include a second outer aperture 336; and the thruster of the at least one dual-state propulsion system can further include:

a) a second thruster blade 307, which is pivotably connected to the central hub 305 in a symmetrically opposing orientation relative to the first thruster blade 306; and b) a second thruster gear assembly 350, including:

i. a second thruster gear 309, comprising second thruster teeth; and ii. a second thruster axle 352, which is connected to an inner center of the second thruster gear 309, such that the second thruster axle 352 is rotatably connected in the second outer aperture of the central hub member 330;

such that the second thruster gear 309 is connected to an inner end of the second thruster blade 307, such that a second gear axis 357 of the second thruster gear 309 is coincident with the blade pitch axis 327; and such that the second thruster gear 309 is in intermeshing contact with the shaft gear 314.

In a further related embodiment, the first thruster gear 308, the second thruster gear 309, and the shaft gear 314 can each be configured as a bevel gear.

In further related embodiments, a dual-state propulsion system 110, 310, 510 can be configured with a plurality of pivotable thruster blades, which are pivotably connected to the central hub 305 in a uniform and symmetrical configuration, which can include 3, 4, 5, or more thruster blades.

Figure 10A:
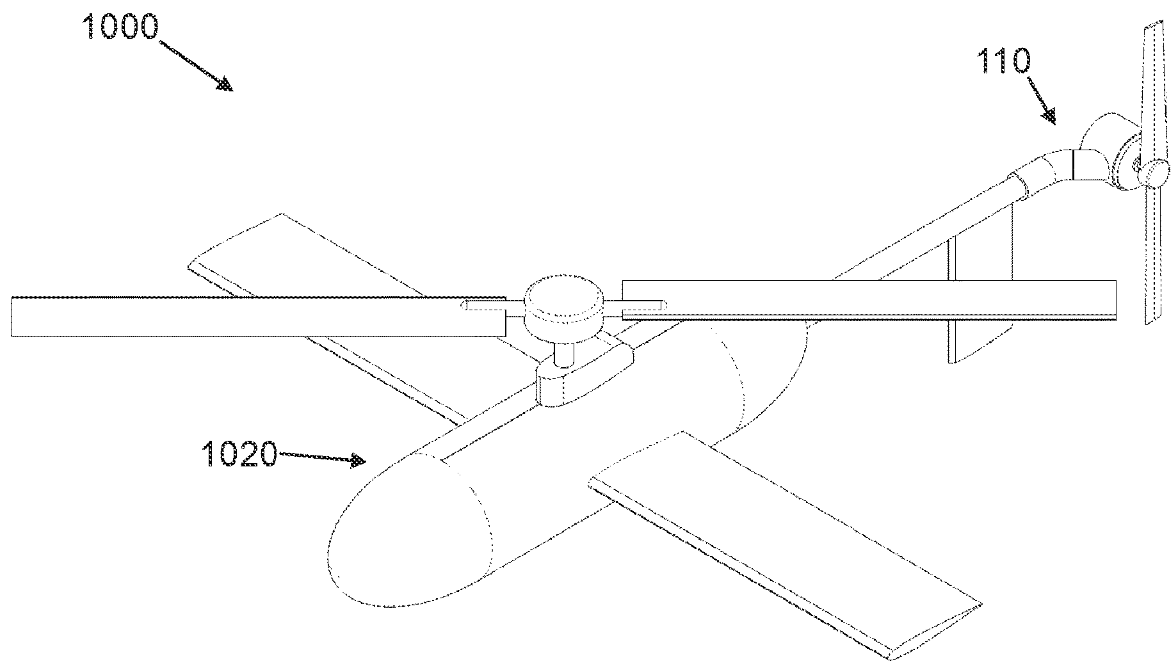
FIG. 10A is a perspective view of a rotary wing aircraft with a dual-state propulsion system positioned as an anti-torque device, according to an embodiment of the invention.
Figure 10B:
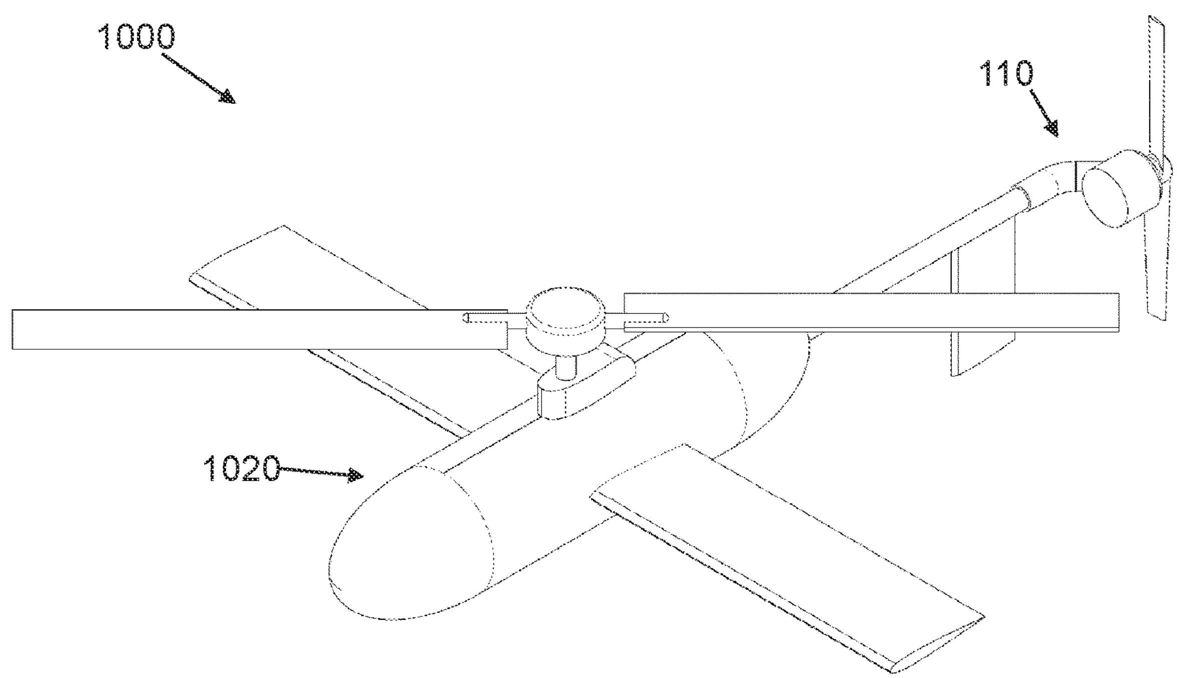
FIG. 10B is a perspective view of a rotary wing aircraft with a dual-state propulsion system positioned as a pusher propeller for use during horizontal flight, according to an embodiment of the invention.

In a related embodiment, as shown in FIGS. 10A and 10B, a dual-state propulsion aircraft 1000 can be configured as a rotary wing aircraft, wherein the dual-state propulsion system 110 is connected to a rear of the aircraft fuselage 1020 to function as an anti-torque device, such that the dual-state propulsion system 110 can be reorientable during forward flight to provide forward propulsion.

Figure 1C:
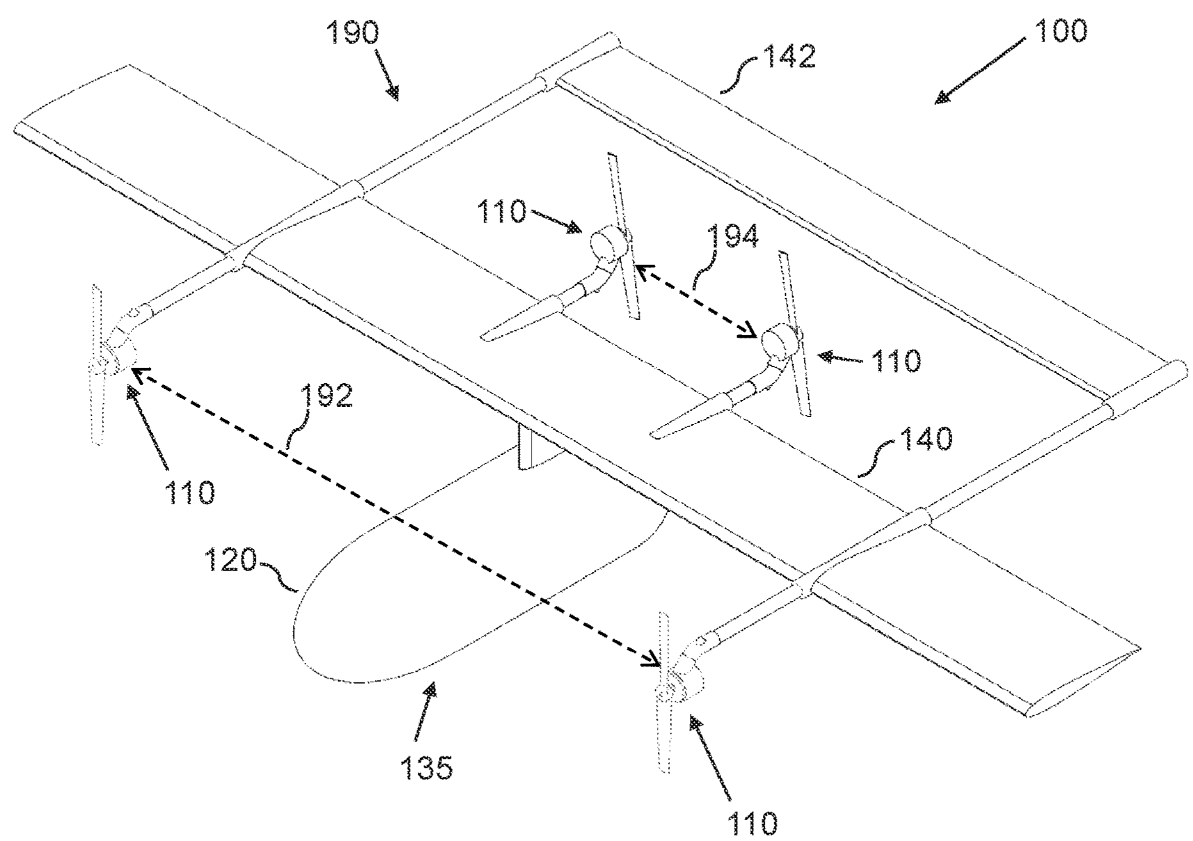
FIG. 1C is a perspective view of a dual-state rotatable propulsion aircraft, according to an embodiment of the invention.
Figure 8C:
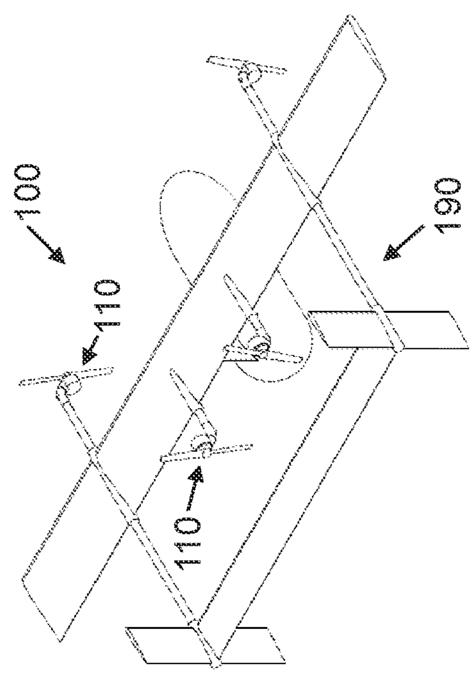
FIG. 8C is a perspective view of a dual-state rotatable propulsion aircraft in a third configuration of a transitioning sequence, according to an embodiment of the invention.
Figure 8B:
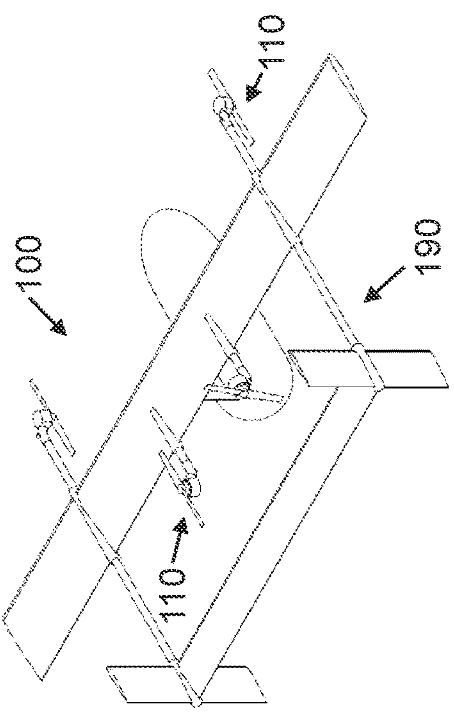
FIG. 8B is a perspective view of a dual-state rotatable propulsion aircraft in a second configuration of a transitioning sequence, according to an embodiment of the invention.
Figure 8A:
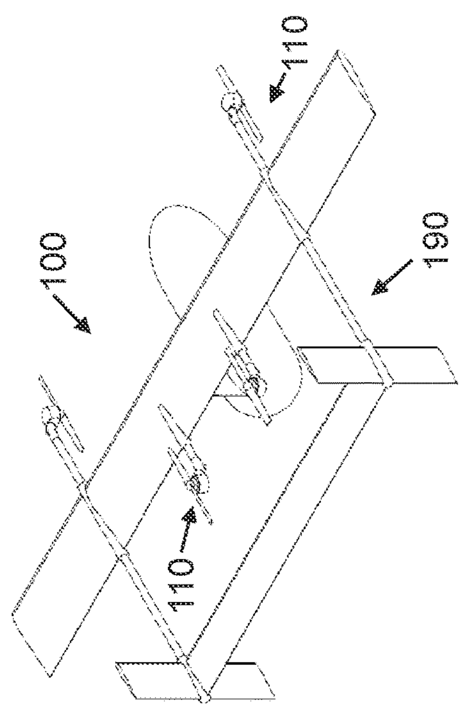
FIG. 8A is a perspective view of a dual-state rotatable propulsion aircraft in a first configuration of a transitioning sequence, according to an embodiment of the invention.
Figure 8D:
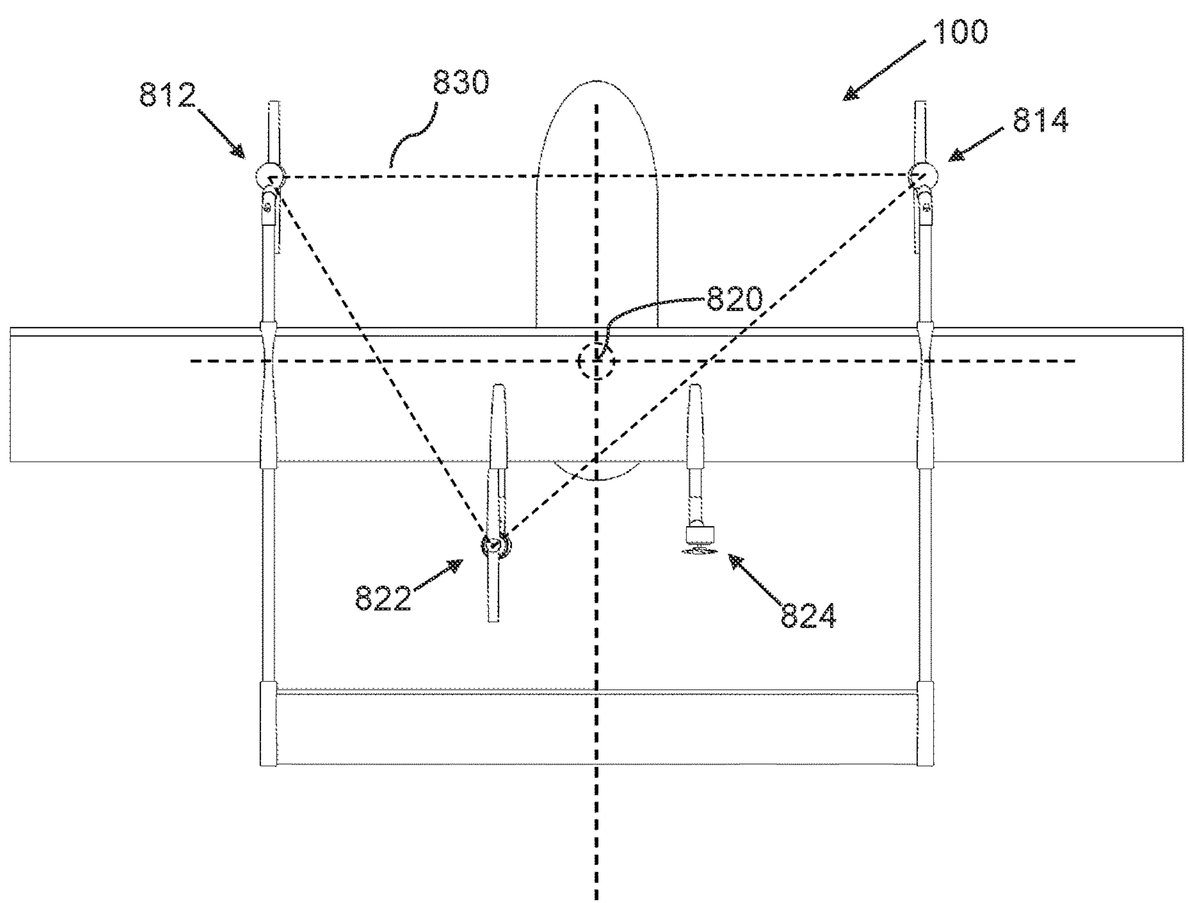
FIG. 8D is a top view of a dual-state rotatable propulsion aircraft in a second configuration of a transitioning sequence, according to an embodiment of the invention.
Figure 9A:
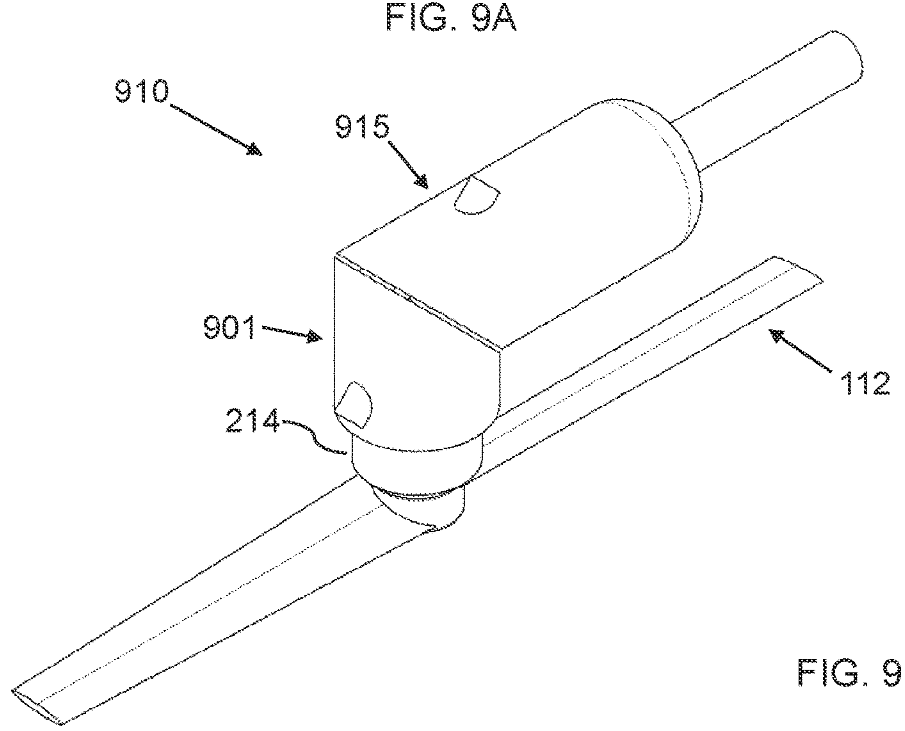
FIG. 9A is a perspective view of a dual-state rotatable propulsion system in a first rotatable position, according to an embodiment of the invention.
Figure 9B:
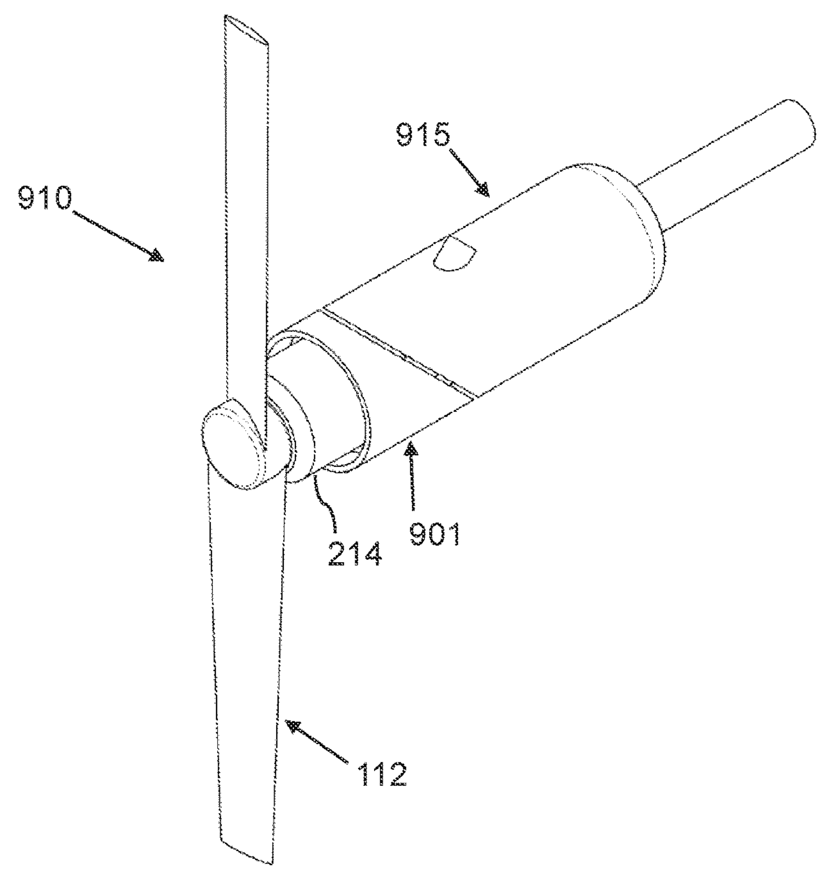
FIG. 9B is a perspective view of a dual-state rotatable propulsion system in a second rotatable position, according to an embodiment of the invention.
Figure 9C:
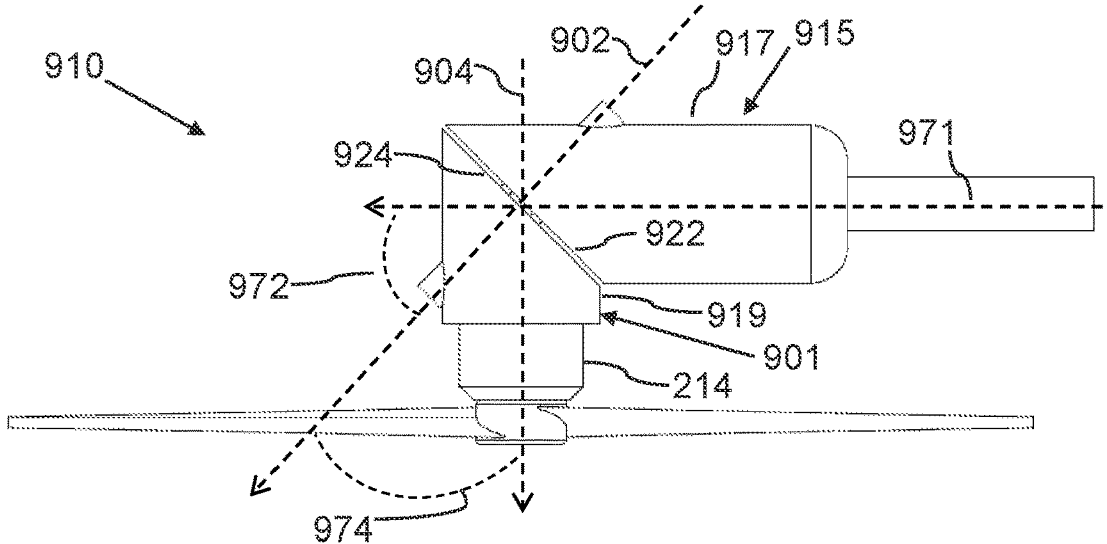
FIG. 9C is a side view of a dual-state rotatable propulsion system in a first rotatable position, according to an embodiment of the invention.
Figure 9D:
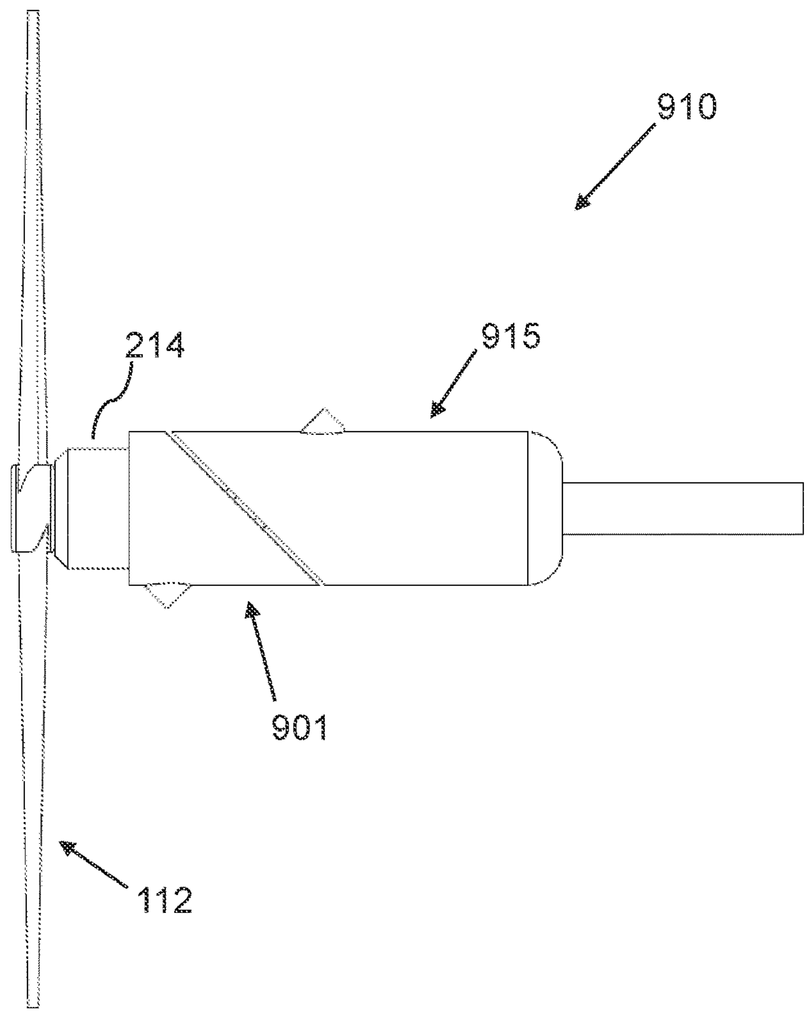
FIG. 9D is a side view of a dual-state rotatable propulsion system in a second rotatable position, according to an embodiment of the invention.

In a related embodiment, as shown in FIG. 1C, the at least one dual-state propulsion system can include a propulsion layout 190, which can include:

a) two front-mounted dual-state propulsion systems 110; and b) two rear-mounted dual-state propulsion systems 110, which are mounted with a smaller separation distance 194 than a larger separation distance 192 of the front-mounted dual-state propulsion systems;

such that the propulsion layout allows 190 one of the two rear-mounted dual-state propulsion systems 110 to be powered off or reoriented without losing pitch or roll stability;

wherein the propulsion layout 190 maintains pitch and roll stability with three dual-state propulsion systems 812, 814, 822 because the center of gravity 820 of the aircraft 100 remains well within a triangular area 830 between the three supporting dual-state propulsion systems 812, 814, 822, since the two rear dual-state propulsion systems 822, 824 are closer together while the two front dual-state propulsion systems 812, 814 are farther apart, as shown in FIGS. 1C and 8D.

In a related alternative embodiment, in a front-rear symmetric variation, the two front-mounted dual-state propulsion systems 812, 814 can be mounted with a smaller separation distance 192 than a larger separation distance 194 of the rear-mounted dual-state propulsion systems 822, 824.

In various embodiments, the dual-state propulsion aircraft 100 implements a tilt thruster/rotor system, which may also take advantage of dedicated vertical lift propulsion, such that it is possible to create a VTOL that uses all available thrust during vertical takeoff with the option of reducing the amount of dead weight carried by the aircraft during horizontal flight. Furthermore, the various embodiments of the present invention are able to accomplish this without using any actuators, with an absolute minimum of moving parts and at the same time provide the option of propulsion redundancy to improve reliability and safety. Finally, this system may be integrated into an aircraft without the need for heavy structural reinforcement, since vertical lift stresses may be distributed along the span of the aircraft.

In various embodiments, a dual-state propulsion aircraft 100, which can also be referred to as a rotatable thruster vehicle 100, a tilt thruster aircraft 100, or a tilt thruster vehicle 100, can include all types of flying devices 100, including airplanes 100, and remote-controlled drones 100, but in some embodiments can include other types of vehicles 100, that may benefit from rotatable propulsion systems 110, such as for example remote-controlled power boats 100, cars 100, submersibles 100, such as a drone submarine, etc. Various other embodiments can include flying devices that may benefit from having rotatable propulsion systems 110, such as novelty flying devices, including hoverboards and other unique configurations.

In related embodiments, the dual-state propulsion aircraft 100 can be configured with landing gear, landing legs, or other type of devices to allow the aircraft 100 to be stably landed or stably positioned on a ground surface.

In related embodiments, the thrusters 112 can be propellers, rotors, or other forms of rotating propulsion mechanisms that generates thrust.

In related embodiments, the thrusters 112 may be powered by electric power, such that each thruster includes an electric engine 214, which receives electric power from at least one electric power source, such as a battery. However, in alternative embodiments, mechanical power may be transferred to each thruster, via axles, chain, or belt mechanical transfer, from at least one engine, such as an electrical or combustion engine.

In other related embodiments, thrusters 112 may be any variety of thrust producing device. In such an embodiment, rotatable propulsion systems 110 can include electric motors and propellers, which are sped up or slowed down by a flight control computer to provide stability control. In related embodiments, stationary vertical lift thrusters and rotatable propulsion systems 110 may work together to provide propulsion and stability during all flight modes. Thrusters which are dedicated to vertical lift may be optimized for static thrust and may be less powerful than standard SLT systems, since they are assisted by the rotatable propulsion systems 110, saving energy and weight. Rotatable propulsion systems 110 may be optimized for dynamic thrust and may be less powerful than would be required by a conventional tilt rotor only system, since they will be assisted by the dedicated vertical lift thrusters during vertical takeoff and landing (VTOL), saving weight and increasing efficiency during forward flight. One beneficial feature of the described hybrid SLT/tilt rotor system is that there is much opportunity for optimization and redundant propulsion. Some rotatable propulsion systems 110 may be powered down during horizontal flight to save power, a popular concept in the field of electric VTOL flight. Various rotatable propulsion systems 110 can be optimized for specific roles while still being able to contribute to other roles. Coaxial thrusters may be used to provide a compact static thrust propulsion system for vertical lift as well as an efficient dynamic thrust propulsion system during forward flight.

In various embodiments, thruster rotatable propulsion systems 110 may be positioned using a variety of positioning sensors.

In other various embodiments, wings 140, 142 may be in a variety of configurations. In a related embodiment, the wings 140 serve as a mounting structure for both the vertical lift thrusters and the rotatable propulsion systems 110, although thrusters may be mounted to a variety of structures which allow them to be connected to the airframe 135. In such an embodiment, the vertical lift thruster can be connected to booms which are then longitudinally attached to the wing, similar to what is the common method of attaching motors to conventional SLT systems. The rotatable propulsion systems 100 can be attached to the wing tips and pivot to provide yaw control during hover and roll and pitch control during horizontal flight. Conventional wing and tailplane and canard configurations as well as tandem wing and triple surface configurations can be used. In tandem and triple wing configurations, it is possible to allow two or more wings/surfaces to share the same longitudinal boom structure to allow the thrusters to be mounted on so that they may lift the aircraft vertically. Because the vertical lift thrusters and the rotatable propulsion systems 110 can be mounted directly to the wing, they can be distributed along the span of the wing 140 and so divide the stress of lifting the wing along the span of the wing which is very structurally efficient.

In various related embodiments, ideally, aircraft control is provided through differential thrust during all modes of flight to increase simplicity and save weight. However, conventional control surfaces and other methods can also be used. Hybrid fuel/electric systems can also be used, for example, the vertical lift thrusters can be shaft driven by a turbine or other engine, while the rotatable propulsion systems 110 can be electrically powered, or the turbine or engine can be configured to generate power for the electrically powered thrusters 112. In some embodiments, the VTOL aircraft 100 can be equipped with landing gear, which enables the aircraft to perform both VTOL and CTOL. Electrically powered, redundant rotors 112 can be used for the rotatable thrusters, such that some of the rotatable thrusters 112 can be shut down during horizontal flight and they may use foldable props to reduce drag. The described methods may be used to enable VTOL for a manned or unmanned aircraft. Fairing or shrouding may be utilized to provide enhanced aerodynamics to vertical lift systems when not in use. Folding propellers may also be utilized for vertical lift thrusters, allowing the propeller blades to passively swing rearward when not in use during horizontal flight. Rotatable propulsion systems 110 may be positioned by actuators, springs, magnets, pendulum effect or other methods when not in use. They may also be axially connected to an airframe 135 by brushless or stepper motors for positioning purposes. During forward flight, thruster assemblies may be held in place using a large variety of mechanical and electromechanical methods, enabling complete stability of thruster assemblies and allowing rotors to be powered off while maintaining horizontal flight nacelle positioning.

In a related embodiment, thrusters 112 can be electrically driven propellers.

In a related embodiment a dual-state propulsion aircraft 100 can be configured with ducted/shrouded fans or rotors.

In a related embodiment, a dual-state propulsion aircraft 100 can further include at least one unpowered rotor, which is configured to rotate and provide lift during forward flight, such that the dual-state propulsion aircraft can be configured as an autogyro/gyrocopter.

In various related embodiments, the dual-state propulsion system 110 has two binary operating states and is mainly operating in one of the two states at any given point in time, with the exception of transitional states between the two states. The state that the system is operating in can be determined by the rotational direction of the propeller/motor shaft, which determines the orientation of the propeller/motor shaft and in many embodiments, the pitch position of the propeller blades. The propeller/motor shaft of the dual-state propulsion system is connected to a pivoting nacelle where the nacelle is able to pivot around a nacelle pivot axis within a mechanically limited range of motion, where the two extremes of the range of motion define a first and second nacelle position. Nacelle position is determined by propeller/motor shaft rotational direction and may be driven by propeller/motor shaft torque. The dual-state propulsion system requires the propeller/motor shaft to be coupled to a propeller system which is able to produce thrust in two opposite directions where one thrust direction is produced during a first propeller/motor shaft rotational direction and a second thrust direction is produced during a second propeller/motor shaft rotational direction. In the simplest embodiment, this may be accomplished using a solid state reversible propeller that is designed to be operated in both rotational directions. In more efficient embodiments this is accomplished through the use of a dual-state propeller system which has a first blade pitch position for producing thrust in a first direction and a second blade pitch position for producing thrust in a second direction.

In an embodiment, utilizing a dual-state propeller, the propeller/motor shaft can be able to rotate freely within the propeller hub within a mechanically limited range of motion, where the two extremes of the range of motion define a first and second propeller/motor shaft position. The propeller blades are pivotably connected to said propeller hub so that the blades may rotate around a blade pitch axis, similarly to conventional adjustable pitch blades found on many aircraft. The propeller blades are able to rotate around a blade pitch axis within a mechanically limited range of motion, where the two extremes of the range of motion define a first and second propeller blade position. The rotational direction of the propeller/motor shaft determines whether the propeller blades are in a first or second position which is accomplished through any means of mechanical interaction between the propeller/motor shaft and the propeller blades for example, geared drives, linkages, cables or any other means. In the first position the propeller blades have a set pitch and thrust direction and in the second position the propeller blades have a set pitch and an opposite thrust direction. This allows the blades to be optimized for static thrust while rotating in a first direction and producing thrust in a first direction while being optimized for dynamic thrust while rotating in an opposite direction and producing thrust in an opposite direction. Because of the limited range of propeller/motor shaft rotation within the hub, the otherwise freely spinning propeller hub will spin with the propeller/motor shaft once the propeller blades have been rotated into the appropriate blade pitch position for the particular propeller/motor shaft rotational direction. In one embodiment, the propeller/motor shaft has cogs which rotate with the shaft while the propeller blades have cogs which rotate with the blades. These propeller/motor shaft cogs and propeller blade cogs intermesh with each other in such a way that when the propeller/motor shaft rotates within the propeller hub, the shaft cogs cause the blade cogs to rotate the blades.

In another related embodiment, the propeller/motor shaft cogs are present in the form of a gear while the propeller blade cogs are also in the form of a gear. The propeller/motor shaft gear intermeshes with all the propeller blade gears so that when the propeller/motor shaft rotates in a first rotational direction within the propeller hub, the propeller blades rotate in a first direction around the propeller blade pitch axis. Once the propeller/motor shaft and/or the propeller blades reach a first position by reaching a mechanical limit, the propeller hub along with the propeller blades begin rotating with the propeller/motor shaft. When the propeller/motor shaft is reversed to rotate in a second rotational direction, it rotates again within the propeller hub causing the propeller blades to rotate in a second direction around the propeller blade pitch axis. Once the propeller/motor shaft and/or the propeller blades reach a second position by reaching a mechanical limit, the propeller hub along with the propeller blades begin rotating with the propeller/motor shaft.

In some embodiments, the propeller/motor shaft cogs and the propeller blade cogs are designed so that a minimal number of large cogs are used as opposed to using a gear which has many small cogs. This would allow for larger and more robust cog structures while requiring less precise gear alignment. In many cases each propeller blade will require a minimum of two cogs intermeshing with three cogs. In one embodiment each propeller blade has a set of three propeller blade cogs, where each set of propeller blade cogs intermesh with a set of two propeller/motor shaft cogs. The middle propeller blade cog is the main propeller blade cog and takes the form of a gear tooth and makes contact with the propeller/motor shaft cogs as they mesh with and rotate the propeller blade cogs and the propeller blades themselves. The main propeller blade cog may be shaped as a narrowing gear tooth in order to rotate the propeller blade less than 180 degrees between first and second positions or shaped as a widening gear tooth in order to rotate the propeller blade more than 180 degrees between first and second positions while a straight non-tapered cog could result in a 180-degree difference between first and second blade pitch positions.

In a torque actuated embodiment of the dual-state propulsion system, the nacelle of the propulsion system has a first position where the nacelle is positioned for vertical flight and a second position where the nacelle is positioned for horizontal flight. The nacelle position is determined by propeller/motor shaft rotational direction where a first shaft rotational direction causes the nacelle to enter into a first position and a second shaft rotational direction causes the propeller/motor shaft to enter into a second position. Typically for VTOL use, the nacelle position will rotate around 180 degrees between the first and second positions resulting in around a 90-degree orientation change for the propeller/motor shaft. In this torque actuated embodiment, the nacelle pivots around a nacelle pivot axis. The propeller/motor shaft axis may intersect the nacelle pivot axis but may not be perpendicular to the nacelle pivot axis. The range of movement of the pivoting nacelle is mechanically limited where the first and second nacelle positions are defined by the extremes of the limited range of motion. The pivoting nacelle is induced to rotate around the said nacelle pivot axis as a result of propeller/motor shaft torque. When the propeller/motor shaft rotates in a first direction, the resulting propeller/motor shaft torque causes the nacelle to pivot around the said nacelle pivot axis in a first direction opposite the propeller/motor shaft rotation. When the propeller/motor shaft rotates in a second direction, the resulting propeller/motor shaft torque causes the nacelle to pivot around the said nacelle pivot axis in a second direction opposite the propeller/motor shaft rotation. In a typical embodiment, the propeller/motor shaft axis would intersect the nacelle pivot axis and may not be perpendicular to the nacelle pivot axis, typically running about 45 degrees from the nacelle pivot axis. The angle between the propeller/motor shaft axis and the nacelle pivot axis will determine the amount of actuation torque placed upon the nacelle, as the actuation torque will increase as the angle between the propeller/motor shaft axis and the nacelle pivot axis is decreased.

Figure 2A:
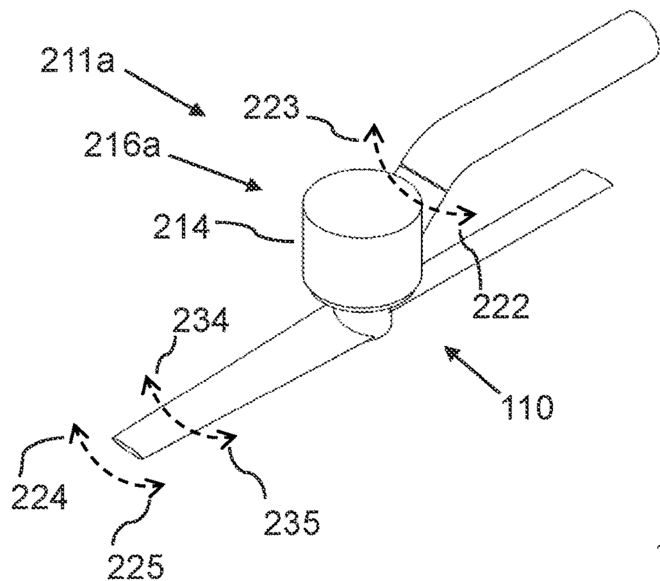
FIG. 2A is a perspective view of a dual-state rotatable propulsion system in a first position, according to an embodiment of the invention.
Figure 2B:
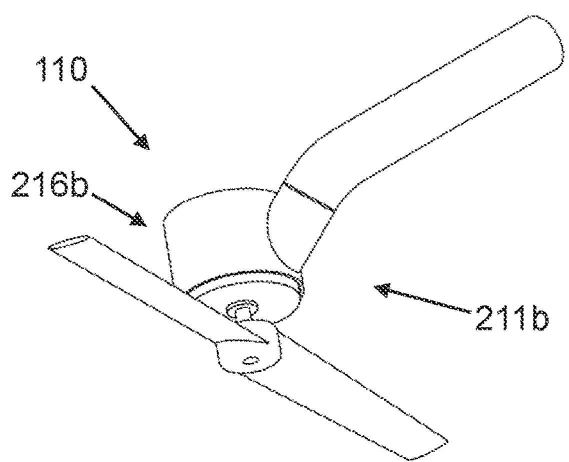
FIG. 2B is a perspective view of a dual-state rotatable propulsion system in an intermediate position, according to an embodiment of the invention.
Figure 2C:
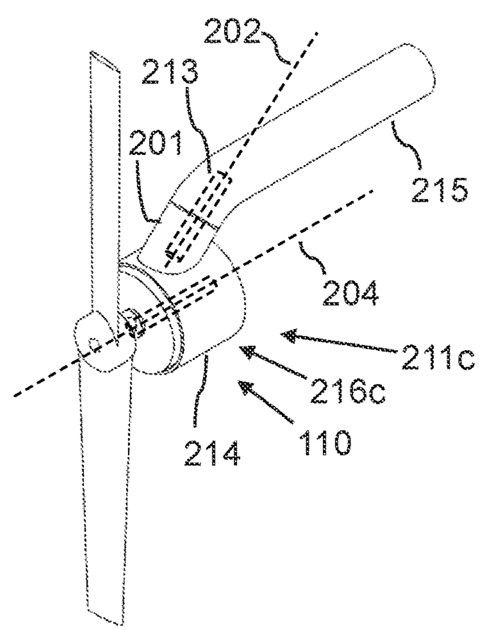
FIG. 2C is a perspective view of a dual-state rotatable propulsion system in a second position, according to an embodiment of the invention.

In a related embodiment, as shown in FIGS. 2A-2C, a torque actuated embodiment utilizes an electric motor mounted to a freely pivoting torque actuated nacelle 201, where the propeller/motor shaft axis 204 intersects the nacelle pivot axis 202 at a 45-degree angle. The nacelle 201 pivots within a nacelle span of rotation, which can be in a range of 5-180, 10-180, 20-180 degrees, 5-210 degrees, 5-355 degrees, 1-359 degrees, or some other suitable range between 0 and 360 degrees, such as for example 180-degree range of motion, such that the nacelle 201 rotates 222, 223 counter to the shaft rotational direction 224, 225, induced by the propeller/motor shaft torque 235, 234.

In a related embodiment, as shown in FIGS. 1 and 2A, the torque actuated embodiment is in a first system position 111*a*, wherein the nacelle 201 has pivoted around the nacelle pivot axis 202 to place the propeller/motor shaft axis 204 into a vertical orientation for vertical flight.

In a related embodiment, as shown in FIG. 2B, the torque actuated embodiment is in an intermediate system position 211*b*, wherein the nacelle is pivoted around the nacelle pivot axis 202 towards placing the propeller/motor shaft axis 204 into a horizontal orientation for horizontal flight (or vice versa, in the opposite rotation back to the first position).

In a related embodiment, as shown in FIG. 2C, the torque actuated embodiment is in a second system position 211*c*, wherein the nacelle has pivoted around the nacelle pivot axis to place the propeller/motor shaft axis into a horizontal orientation for horizontal flight.

In another related embodiment, a torque actuated embodiment can utilize an electric motor mounted to a freely pivoting torque actuated nacelle 201, wherein the propeller/motor shaft axis 204 does not intersect the nacelle pivot axis 202. The nacelle pivots within a 90-degree range of motion and rotates counter to the propeller blade thrust, wherein:

a) the torque actuated embodiment can be in a first position where the nacelle 201 has pivoted around the nacelle pivot axis 202 to place the propeller/motor shaft axis 204 into a vertical orientation for vertical flight; and b) the torque actuated embodiment can be in a second position where the nacelle has pivoted around the nacelle pivot axis to place the propeller/motor shaft axis into a horizontal orientation for horizontal flight.

In another related embodiment, an alternate torque actuated embodiment can utilize an electric motor mounted to a freely pivoting torque actuated nacelle 201, where the propeller/motor shaft axis 204 does not intersect the nacelle pivot axis 202. The nacelle 201 pivots within a 180-degree range of motion and rotates counter to the propeller blade thrust. The alternate torque actuated embodiment can be configured such that:

a) The alternate torque actuated embodiment is in a first position where the nacelle 201 has pivoted to place the propeller/motor shaft axis 204 into a first position for horizontal flight; and b) the alternate torque actuated embodiment where the nacelle has pivoted to place the propeller/motor shaft axis into a second position for horizontal flight;

In a related embodiment, as shown in FIGS. 3A-3C and 4A-3C, a dual-state propeller system 310, can include a propeller/motor shaft 303 having a propeller/motor shaft axis 204 where the propeller/motor shaft 303 rotates freely within a propeller hub 305 and propeller blades 306, which are pivotably connected to the propeller hub 305 which rotate freely around a blade pitch axis 327. As the propeller/motor shaft 303 rotates in a first shaft direction 324 within and in relation to the propeller hub 305, the propeller blades 306 are induced to rotate in a first pitch direction 322 around a blade pitch axis 327 in relation to the propeller hub 305. Inversely, rotating the propeller/motor shaft 303 in a second shaft direction 325 within the propeller hub 305 induces the propeller blades 306 to rotate in a second pitch direction 323. The propeller/motor shaft 303 and/or the propeller blades 306 rotate freely within a mechanically limited range of rotation in relation to the propeller hub 305. Once the propeller/motor shaft 303 and/or propeller blades 306 reach their mechanical limit of rotation, the propeller hub 305 is forced to rotate with the propeller/motor shaft 303. The mechanical limits of the first and second propeller blade/nacelle positions 316*a*, 316*c*, between the intermediate propeller blade/nacelle position 216*b*, 316*b*, determine the first and second propeller blade pitch positions 402*a*, 402*c*, between the intermediate propeller blade pitch position 402*b*, allow the first and second positions to have two opposite thrust directions and two different pitch positions and therefore thrust optimizations. The propeller/motor shaft/blade interaction may be accomplished through any number of mechanical means including gears, linkages, rack and pinion mechanisms, etc.

Figure 3A:
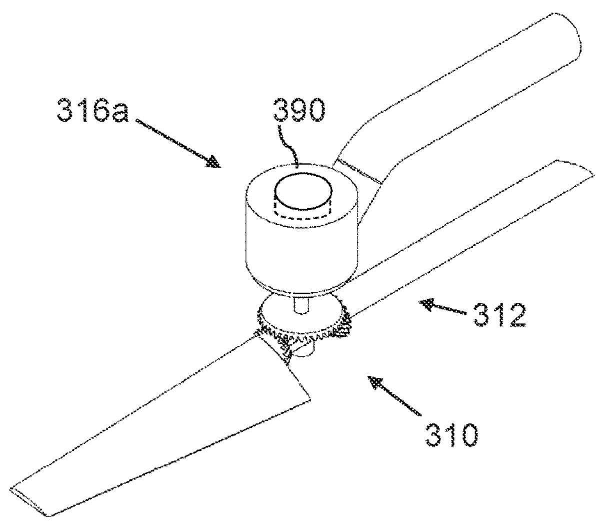
FIG. 3A is a perspective view of a dual-state rotatable propulsion system in a first rotatable position, according to an embodiment of the invention.
Figure 3B:
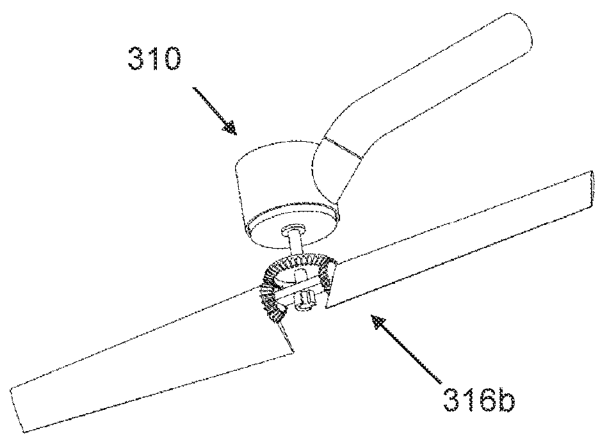
FIG. 3B is a perspective view of a dual-state rotatable propulsion system in an intermediate rotatable position, according to an embodiment of the invention.
Figure 3C:
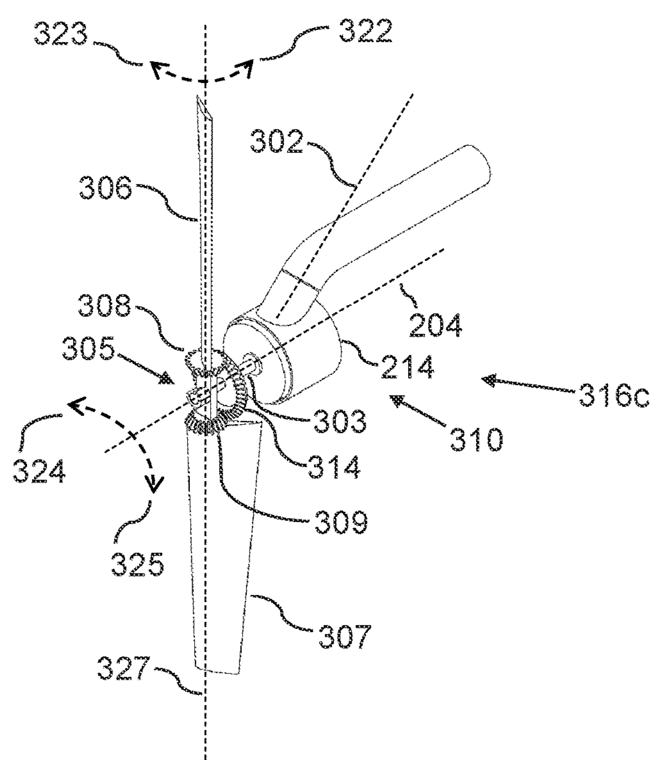
FIG. 3C is a perspective view of a dual-state rotatable propulsion system in a second rotatable position, according to an embodiment of the invention.
Figure 3D:
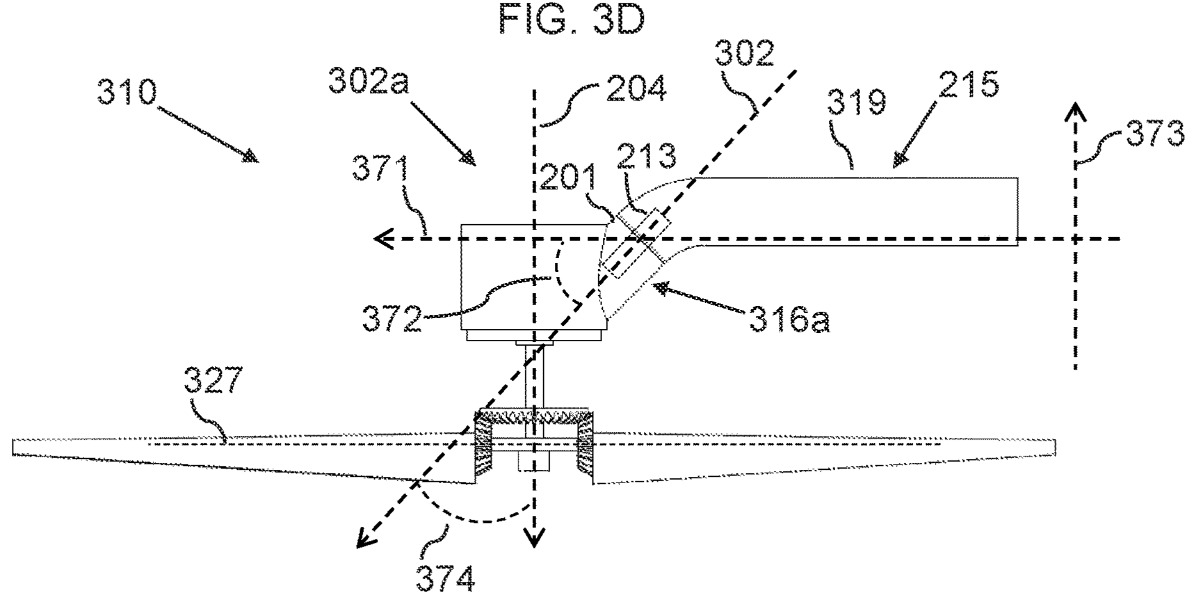
FIG. 3D is a side view of a dual-state rotatable propulsion system in a first rotatable position, according to an embodiment of the invention.
Figure 3E:
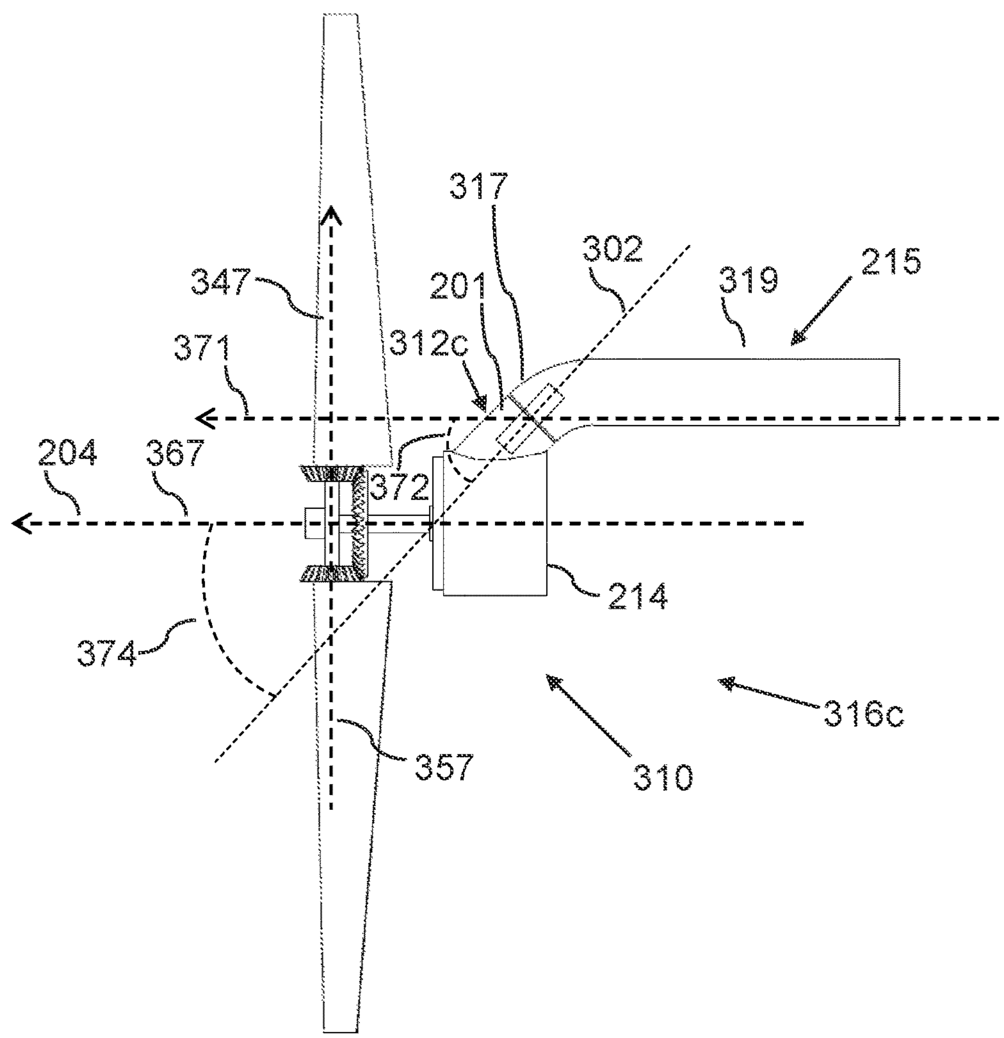
FIG. 3E is a side view of a dual-state rotatable propulsion system in a second rotatable position, according to an embodiment of the invention.
Figure 3F:
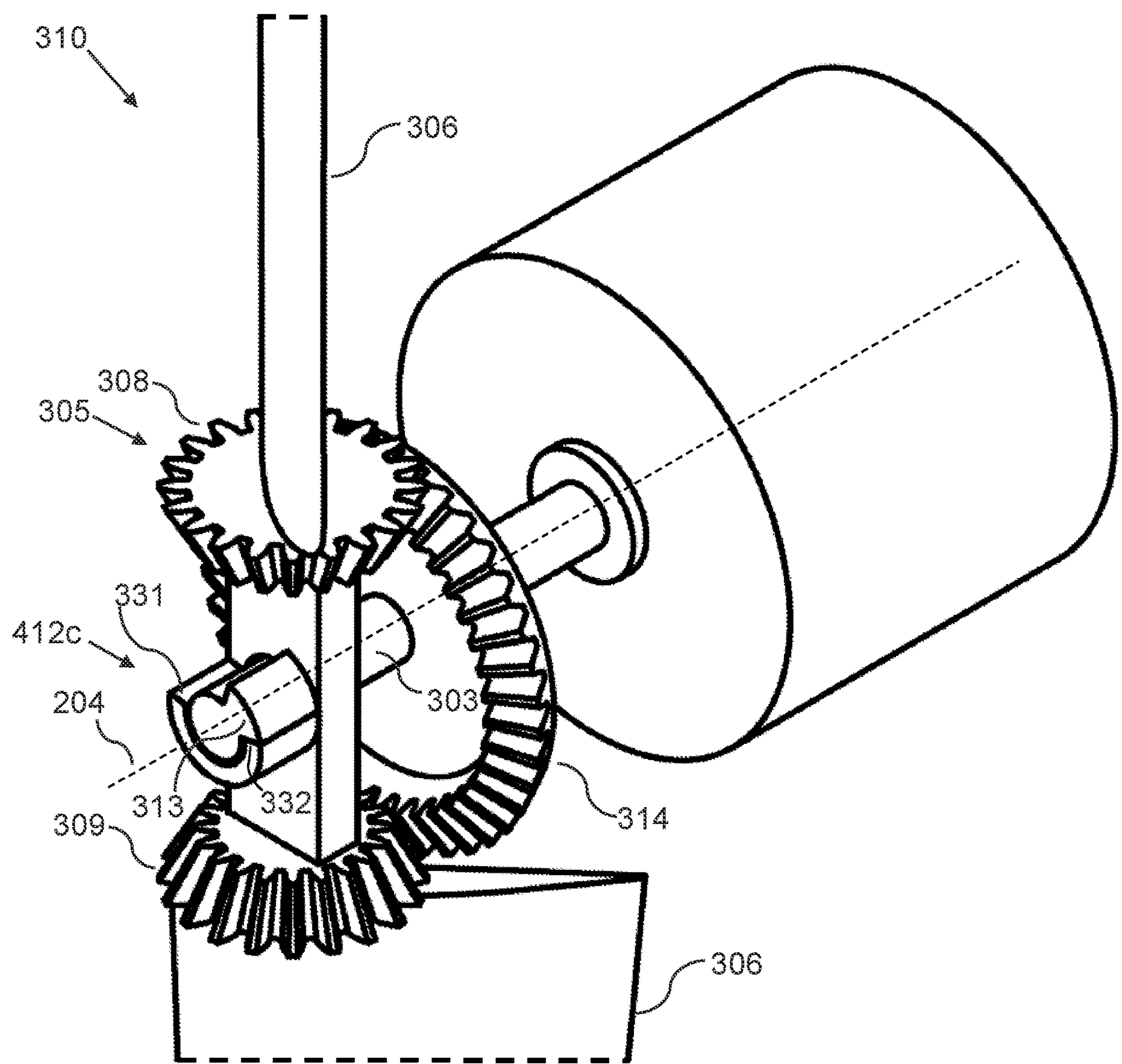
FIG. 3F is a perspective view of a pitchable hub assembly of a dual-state rotatable propulsion system in a second rotatable position, according to an embodiment of the invention.
Figure 3G:
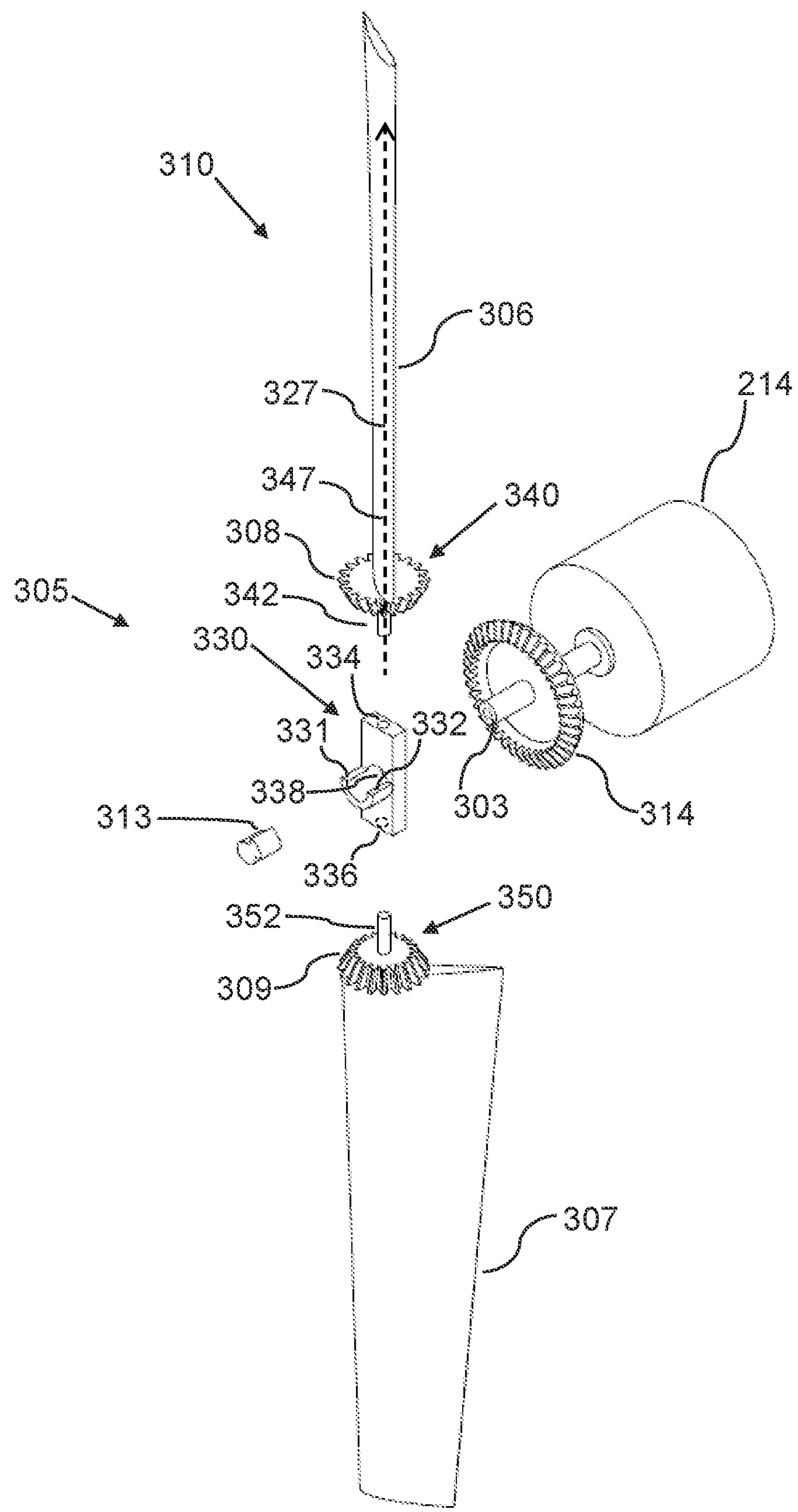
FIG. 3G is a perspective exploded view of a dual-state rotatable propulsion system, according to an embodiment of the invention.

In a related embodiment, FIG. 3G shows an exploded view of an embodiment of a dual-state propeller system 310 where the propeller/motor shaft 303 rotates around a propeller/motor shaft axis 204 and has propeller/motor shaft cogs 314 which rotate with the propeller/motor shaft while the propeller blades rotate around a propeller blade pitch axis 327 and have propeller blade cogs 308 which rotate with the propeller blades and the propeller/motor shaft cogs 314 intermesh with the propeller blade cogs 308. The propeller/motor shaft 303 rotates freely within the propeller hub 305. The propeller hub mechanical stops 331, 332 make contact with the propeller/motor shaft mechanical stop 313 to limit the range of propeller/motor shaft rotational movement within the hub and thereby also limiting the range of movement of the propeller blades around the propeller blade pitch axis.

Figure 4A:
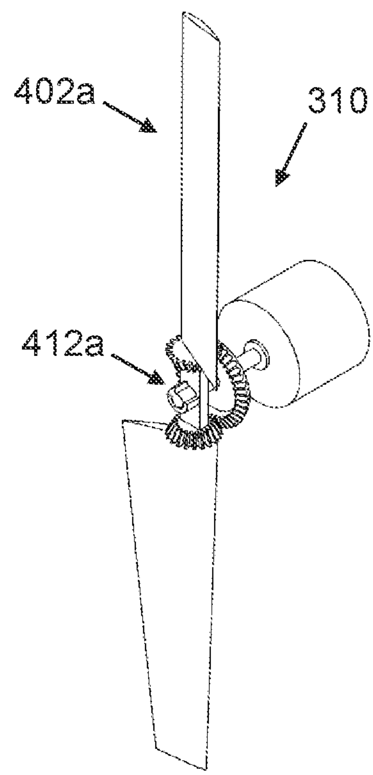
FIG. 4A is a perspective view of a dual-state rotatable propulsion system in a first pitch position, according to an embodiment of the invention.

In a related embodiment, FIG. 4A shows a perspective view of an embodiment of a dual-state propeller system, wherein the propeller/motor shaft is rotated into a first pitch position by rotating until the propeller/motor shaft mechanical stop comes into contact with the propeller hub mechanical stop and the intermeshing propeller/motor shaft cogs and propeller blade cogs have rotated the propeller blades into the first pitch position.

Figure 4B:
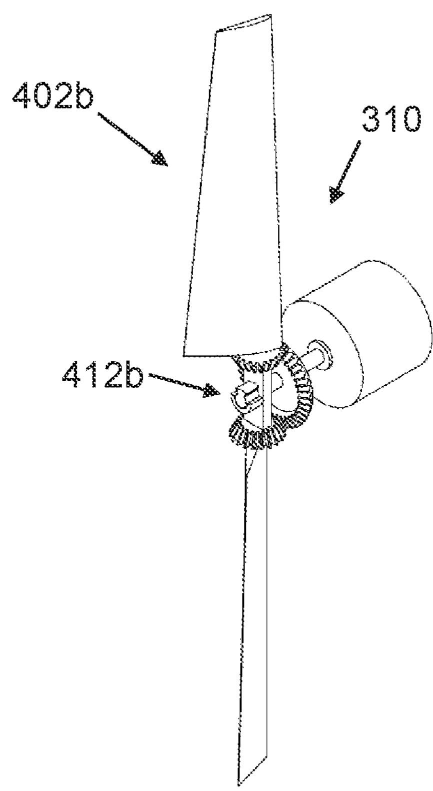
FIG. 4B is a perspective view of a dual-state rotatable propulsion system in an intermediate pitch position, according to an embodiment of the invention.
Figure 4C:
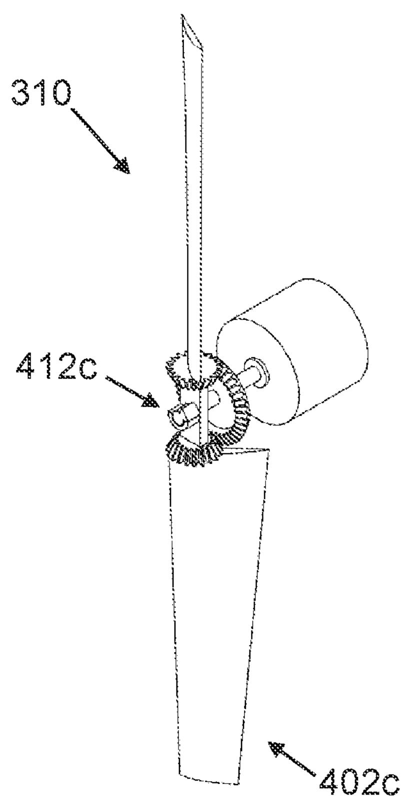
FIG. 4C is a perspective view of a dual-state rotatable propulsion system in a second pitch position, according to an embodiment of the invention.

In a related embodiment, FIG. 4C shows a perspective view of an embodiment of a dual-state propeller system where the propeller/motor shaft is rotated into a second pitch position by rotating until the propeller/motor shaft mechanical stop comes into contact with the propeller hub mechanical stop and the intermeshing propeller/motor shaft cogs and propeller blade cogs have rotated the propeller blades into a second pitch position.

In a related embodiment, FIG. 4B shows a perspective view of an embodiment of a dual-state propeller system where the propeller/motor shaft is rotated into an intermediate pitch position between the first pitch position and the second pitch position.

In a related embodiment, as shown in FIGS. 6A-6C and 7A-7C, a dual-state propulsion system 610 can be configured with a central hub assembly 605 with a mechanically limited range of propeller pitch rotation, wherein the central hub assembly 605 can include:

- a) a motor 214, which includes a motor shaft 303;
- b) a central hub 630, which includes:
  - i. a hub base 632, which includes:
    - 1) a motor shaft mounting aperture 633;
  - ii. a left longitudinal flange 634, which includes:
    - 1) a left first side mechanical stop 636;
    - 2) a left second side mechanical stop 638; and
    - 3) a left shaft aperture 639;
  - iii. a right longitudinal flange 644, which includes:
    - 1) a right first side mechanical stop 646;
    - 2) a right second side mechanical stop 648; and
    - 3) a right shaft aperture 649;
- c) a passive shaft 650;
- d) a center gear 660, which is configured to be rotatable in a lateral plane, such that the center gear 660 is rotatably mounted on a top of the hub base 632 between the left longitudinal flange 634 and the right longitudinal flange 644;
- e) a left blade grip assembly 670, which can include:
  - i. an inner mounted left partial gear 672, comprising a plurality of cogs or teeth;
  - ii. a left blade intermediate mechanical stop 675; and
  - iii. an outer mounted left blade grip 678; and
- f) a right blade grip assembly 680, which can include:
  - i. an inner mounted left partial gear 682;
  - ii. a left blade intermediate mechanical stop 685; and
  - iii. an outer mounted right blade grip 688.

In related embodiments, a dual-state propulsion system 610 as shown in FIGS. 6A-6C and 7A-7C can have the following functional characteristics:

- a) The hub assembly features a single shaft design. The shaft is also passive in that it allows the blade grips/propeller blades to rotate without needing to drive the rotation of the blade grips/propeller blades. One long contiguous shaft is much simpler and stronger than two or more short shafts, which then need to be connected together by a bulky propeller hub;
- b) The blade grip gearing is attached to the blade grip by the blade grip mechanical stop, which in effect operates as an eccentric shaft between the blade grip gearing and the blade grip. This eliminates the need for the blade grip to be driven directly by the shaft itself and eliminates the need for the precision parts that would be required by two or more gear driven shafts; and
- c) In the above embodiment, the mechanical stops control the binary blade pitch positions by limiting the rotation of the propeller blades themselves as opposed to limiting the hub rotation. The shape and angle of the hub mechanical stops determines the blade pitch position.

Figure 5A:
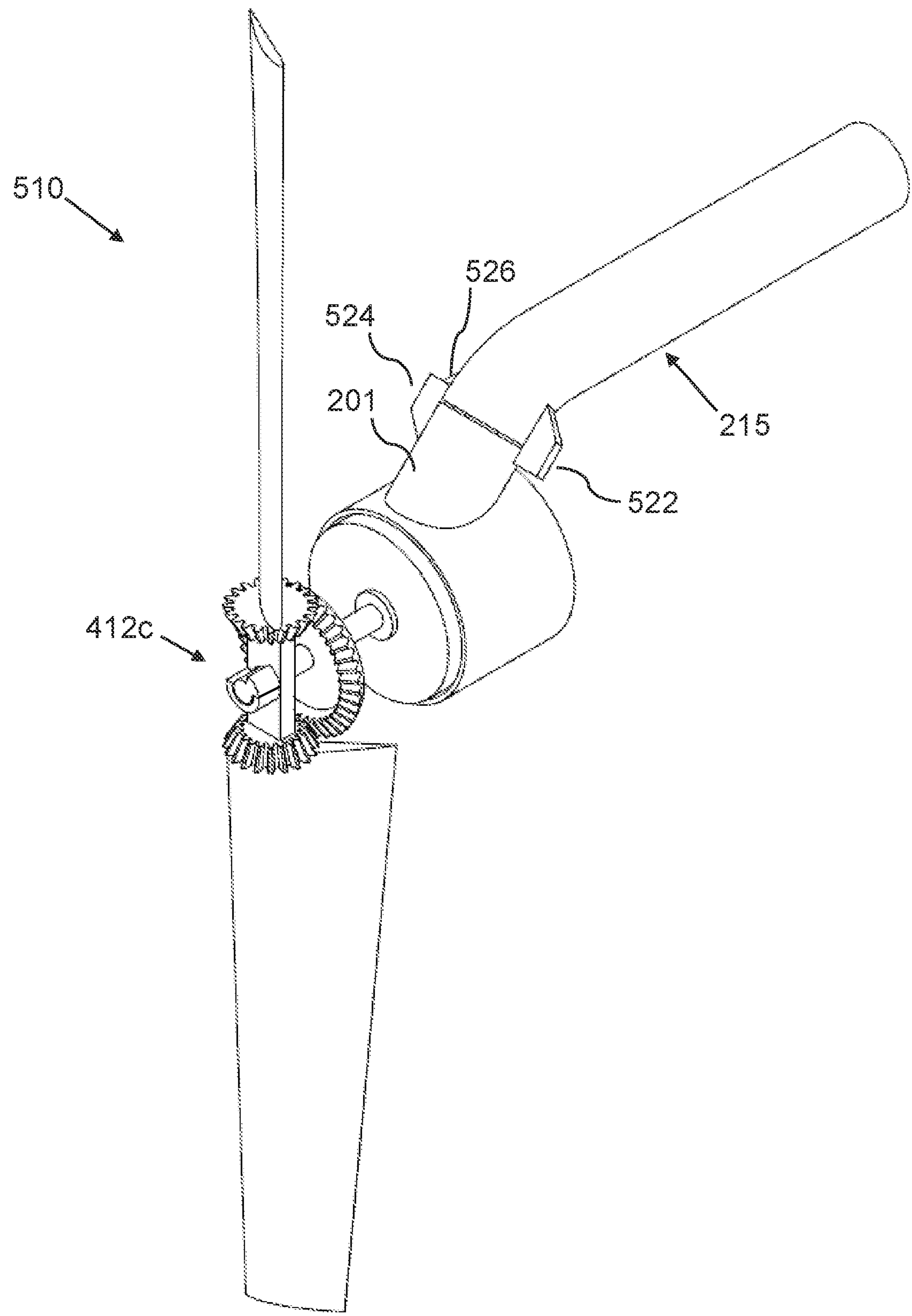
FIG. 5A is a perspective view of a dual-state rotatable propulsion system with mechanical rotation stop limits for first and second rotation positions and mechanical pitch stop limits for first and second pitch positions, according to an embodiment of the invention.
Figure 5B:
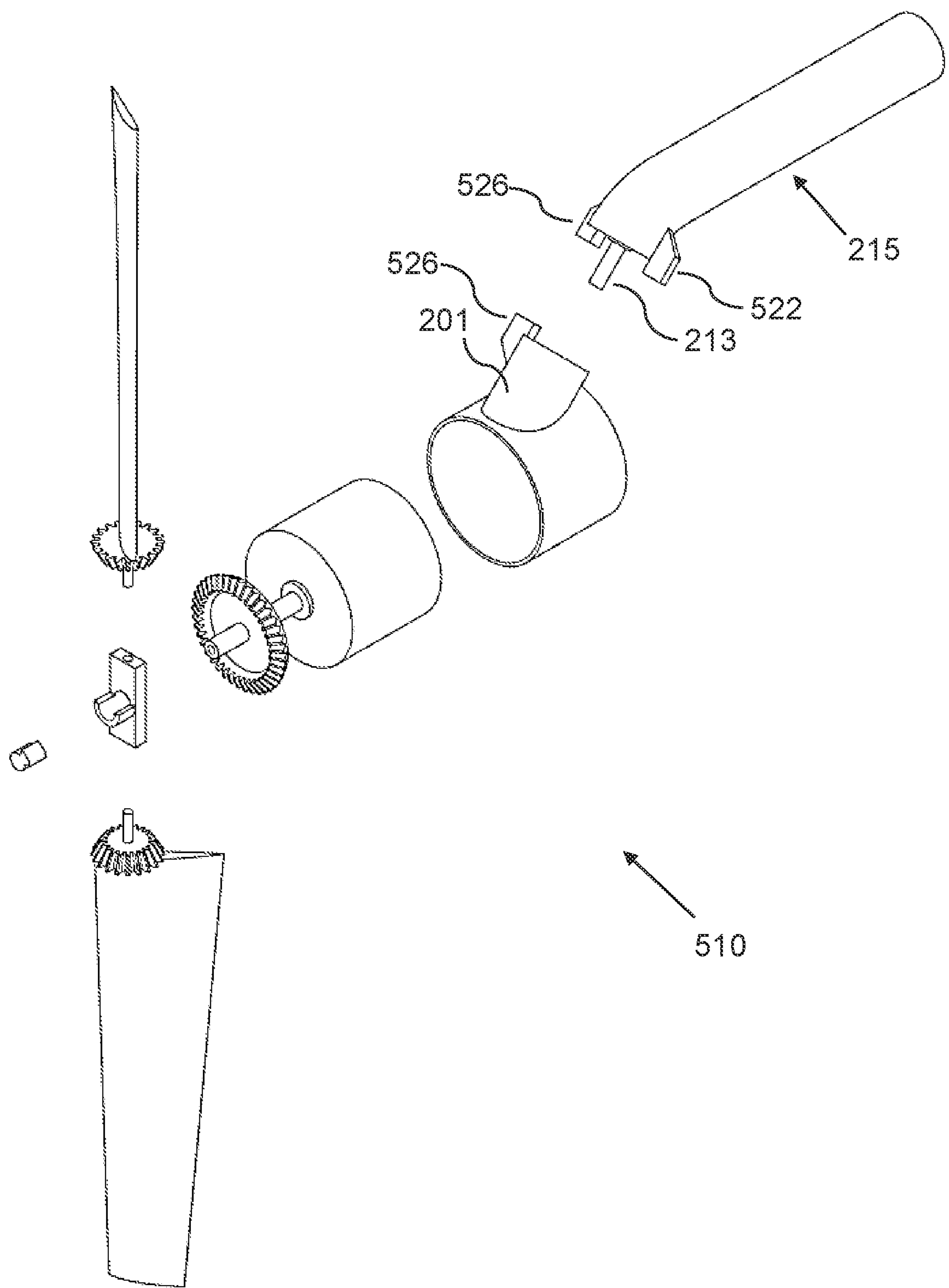
FIG. 5B is a perspective view of a dual-state rotatable propulsion system with mechanical rotation stop limits for first and second rotation positions and mechanical pitch stop limits for first and second pitch positions, according to an embodiment of the invention.
Figure 6A:
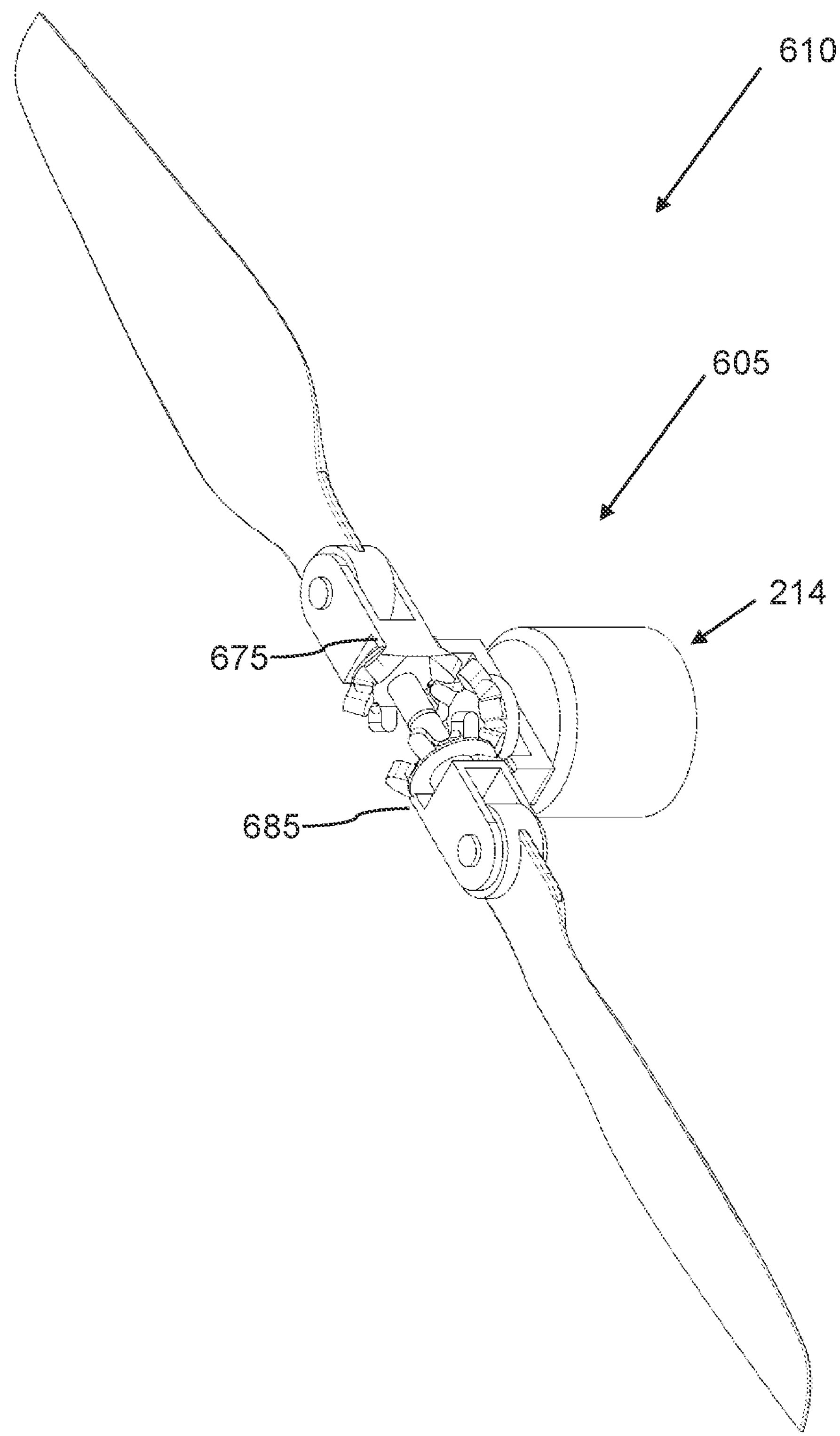
FIG. 6A is a perspective view of a dual-state rotatable propulsion system with mechanical pitch stop limits for first and second pitch positions, according to an embodiment of the invention.
Figure 6B:
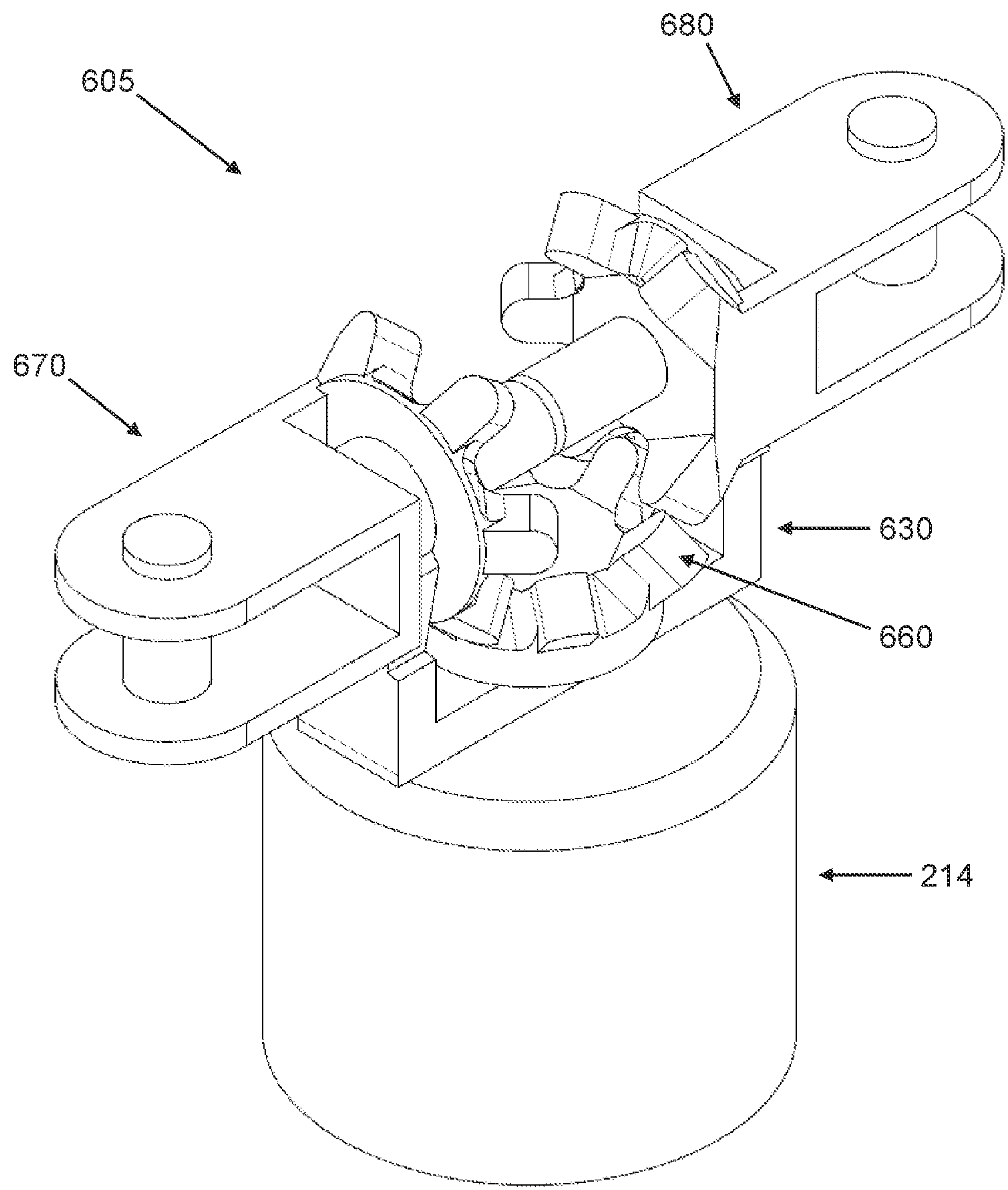
FIG. 6B is a perspective view of a hub assembly of a dual-state rotatable propulsion system with mechanical pitch stop limits for first and second pitch positions, according to an embodiment of the invention.
Figure 6C:
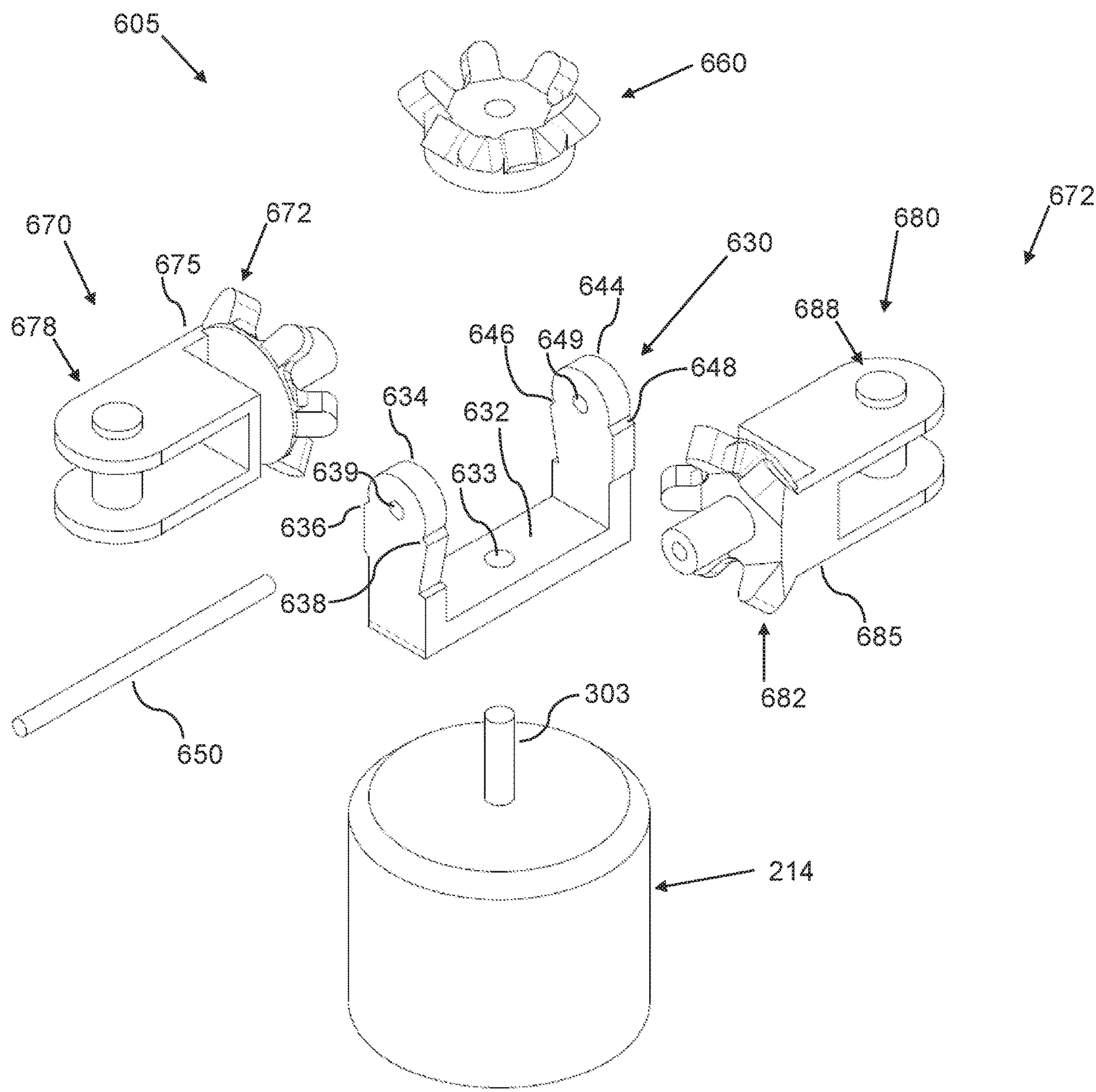
FIG. 6C is a perspective exploded view of a hub assembly of a dual-state rotatable propulsion system with mechanical pitch stop limits for first and second pitch positions, according to the embodiment of the invention.
Figure 7A:
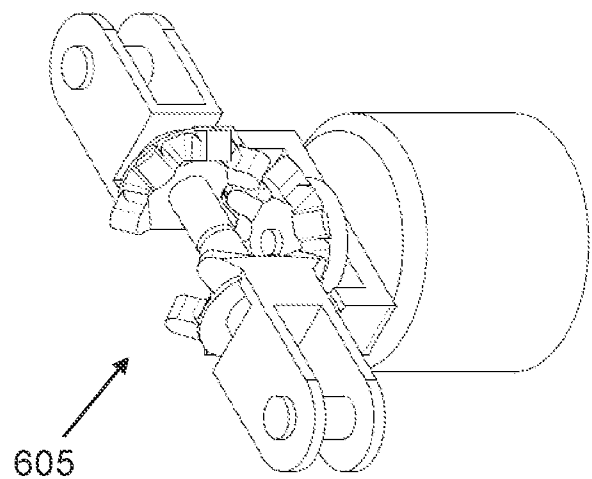
FIG. 7A is a perspective view of a dual-state rotatable propulsion system in a first pitch position, according to the embodiment shown in FIGS. 6A-6C.
Figure 7B:
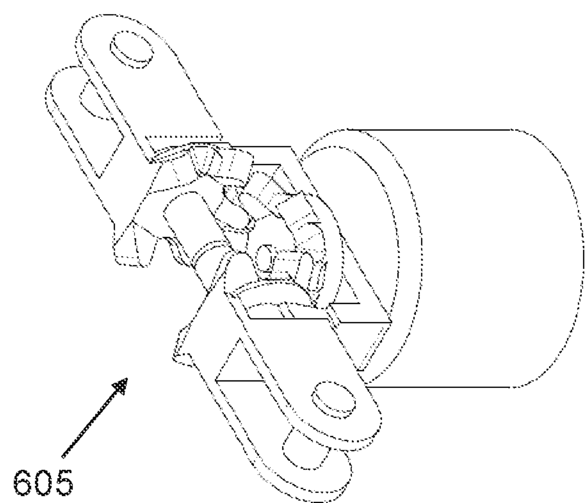
FIG. 7B is a perspective view of a dual-state rotatable propulsion system in an intermediate pitch position, according to the embodiment shown in FIGS. 6A-6C.
Figure 7C:
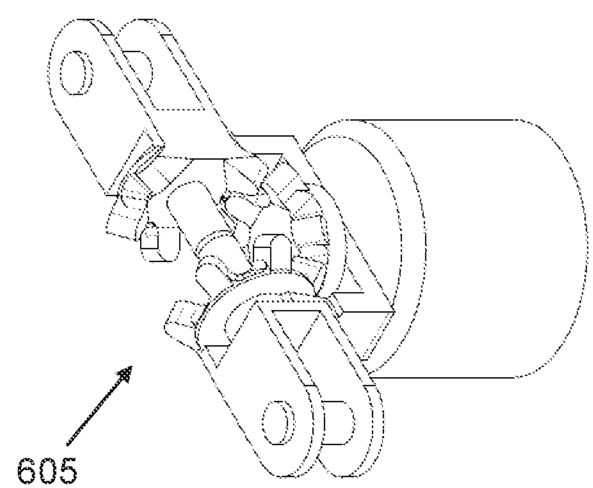
FIG. 7C is a perspective view of a dual-state rotatable propulsion system in a second pitch position, according to an embodiment of the invention.

In a related embodiment, FIG. 5B shown an embodiment of a dual-state propeller system 510, wherein the nacelle 201 is torque actuated and pivots around a nacelle pivot axis 302 within a mechanically limited range. The propeller/motor shaft 303 rotates around a propeller/motor shaft axis 204 and rotates freely within the propeller hub 305 and has propeller/motor shaft cogs 314 which rotate with the propeller/motor shaft 303 while each propeller blade 306 has propeller blade cogs 308 which rotate with the propeller blade 306 around a propeller blade pitch axis 327. The propeller/motor shaft 303 has propeller/motor shaft cogs 314 for each propeller blade 306. The propeller/motor shaft 303 has propeller/motor shaft mechanical limits 313 which interact with propeller hub mechanical limits 331, 332. In some embodiments the propeller/motor shaft mechanical limit structures can take the form of the propeller/motor shaft cogs themselves.

In an embodiment, FIGS. 8A-8C show a transitioning sequence for a dual-state propulsion aircraft 100, wherein a dual-state propulsion aircraft 100 is configured with a motor layout comprising two front-mounted dual-state propulsion systems 110, 812, 814 and two rear-mounted dual-state propulsion systems 110, 812, 814 which are mounted closer together, with a smaller separation than the front-mounted dual-state propulsion systems 110, such that:

- a) The motor layout will allow one of the rear (closer together) motors to be powered off without losing pitch or roll stability. Yaw stability is lost momentarily while the motor is powered off but then regained as soon as the motor is powered on again in horizontal flight mode. At this point the horizontally thrusting motor will drive the aircraft forward while providing yaw control by acting as an anti-torque rotor to the three vertically thrusting motors which will create a yaw moment since they are an odd number of torque generating devices. The momentary loss of yaw control can be greatly mitigated by relative wind acting upon vertical tail surfaces;
- b) Once the aircraft is moving forward, the three vertical flight motors may be powered off and reverse direction so they go into horizontal flight mode;
- c) This procedure allows for smooth transition using only four motors. If an aircraft has five or more thrusters, transitioning to forward flight can be done simply by progressively reversing motors and does not require any loss of yaw control; and
- d) The motor layout maintains pitch and roll stability with three motors 812, 814, 822 because the center of gravity 820 of the aircraft 100 remains well within a triangular area 830 between the three supporting motors 812, 814, 822, since the two rear motors 822, 824 are closer together while the two front motors 812, 814 are farther apart, as shown in FIGS. 1C and 8D.

In various embodiments, such as shown in FIGS. 2A-2C, 3A-3C, 4A-4C, and 7A-7C, rotational direction reversal of the motor causes actuation of nacelle rotation and in some embodiments actuation of propeller pitch pivoting of the propeller hub mechanism. If this is done at high speed it would require very heavy and robust structures to accommodate the generated forces and substantial dynamic load and can limit the impact force on the mechanical stops of the nacelles and, if applicable, the propeller mechanisms. Appropriate configuration of the power manager 1110 of the aircraft control unit 1042 that manages motor stopping and reversing can allow for efficient and lightweight structures. Shutting off the motor and allowing it to gradually stop is very gentle on the aircraft structure but extends the time duration needed for the nacelle to go from one flight mode to another. In some further related embodiments, braking the motor (ESC/electronically) can reduce this wait time but must be limited or it will cause the nacelle to slam hard to the opposite position.

In a related embodiment, the power manager 1110 of the aircraft control unit 1042 can be configured such that:

a) an initiation process, to start a nacelle rotation, such as shown in FIGS. 2A, 3A, and 4A, can include:
   i. First, a minimum actuation throttle is supplied to the motor for a sufficient amount of time to induce actuation of the nacelle and in some embodiments, the propeller hub mechanisms. This minimum actuation throttle causes all nacelle and propeller mechanical limits to make contact with each other; and
   ii. Then, full power may be applied; and b) a reversal process, to reverse a nacelle rotation, from a starting point such as shown in FIGS. 2C, 3C, and 4C, can include:
   i. The motor is powered off, and optionally electronically braked;
   ii. Minimum actuation throttle is again applied, in the opposite direction; and
   iii. Full power may be appalled;

wherein the initiation and reversal processes serve to prevent the mechanisms and mechanical stops from slamming into each other. Once mechanical stop contact is made, full power and throttle changes can be freely applied. By avoiding motor braking and maintaining at least minimum actuation throttle power, mechanical stop contact can be easily maintained during operation. By maintaining at least the minimum actuation throttle, a nacelle will maintain a vertical or horizontal flight mode orientation on the ground or in the air.

In related embodiments, a dual-state propeller system assembly can include more than two propeller blades.

In related embodiments, a dual-state propeller system assembly can include more than two propeller blades.

In other related embodiments, a dual-state propeller system assembly can include a blade shroud to cover propeller blades.

In other related embodiments, dual-state propulsion systems can be mounted to a conventional motor boom typically used for electric VTOL aircraft. A first nacelle can operate in a tractor configuration and a second nacelle can operate in a pusher configuration during horizontal flight. The nacelles can be torque actuated, equipped with dual-state propeller systems and are oriented for vertical flight.

In reference to FIGS. 10A and 10B, a rotary wing aircraft 1000 can utilize a rear-mounted dual-state propulsion system 110 as an anti-torque device, as shown in FIG. 10A, such that the state of the dual-state propulsion system 110 may be reoriented during forward flight to provide forward propulsion as a pusher propeller, as shown in FIG. 10B.

In a related embodiment, as shown in FIG. 1A, the dual-state propulsion aircraft 100 can further include an aircraft control unit 1142, which can be mounted in the airframe 135, including aircraft body/fuselage 120, for example in a main body 120, wherein the aircraft control unit 1042 is configured to control a specific power applied to the motor 214 in a dual-state rotatable propulsion system 110.

In a further related embodiment, as shown in FIG. 1A, the dual-state propulsion aircraft 100 can be configured to communicate, via the aircraft control unit 1142 with a remote-control device 180, such that a user 1120 can use the remote-control device 180 to control the dual-state propulsion aircraft 100.

Figure 11:
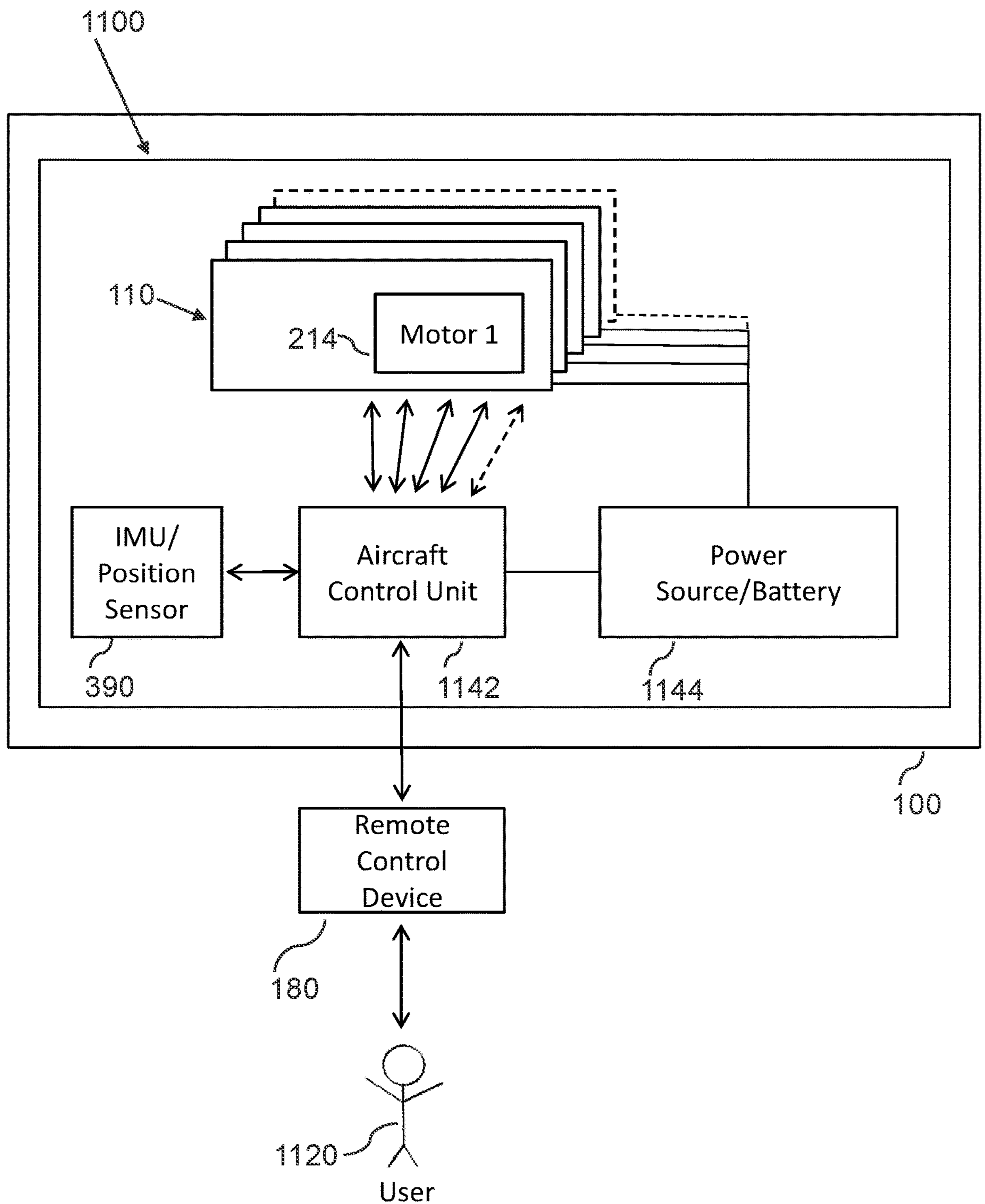
FIG. 11 is a schematic diagram illustrating a dual-state rotatable aircraft system, according to an embodiment of the invention.

In an embodiment, as shown in FIG. 11, a dual-state rotatable aircraft system 1100 can include:

a) a plurality of dual-state rotatable propulsion systems 110, 310, 510, 610, each including a motor 214;

b) a power source 1144, such as a rechargeable battery 1144;

c) an inertial measurement unit/position sensor 390, which can be connected to the rotatable shaft 303 (or a selected dual-state rotatable propulsion system 110, 610), such that the inertial measurement unit/position sensor 390 is configured to measure a position of the rotatable shaft 303 (or a selected dual-state rotatable propulsion system 110, 310, 510, 610); and d) an aircraft control unit 1042, which can be mounted in a main body of the aircraft 100;

wherein the aircraft control unit 1142 is configured to control a specific power applied for each motor 214 in the plurality of dual-state rotatable propulsion systems 110, 310, 510, 610, wherein the specific power applied for each motor 214 is provided by the power source 1144. The inertial measurement unit/position sensor 390 can alternatively be a component of the aircraft control unit 1142.

Figure 12:
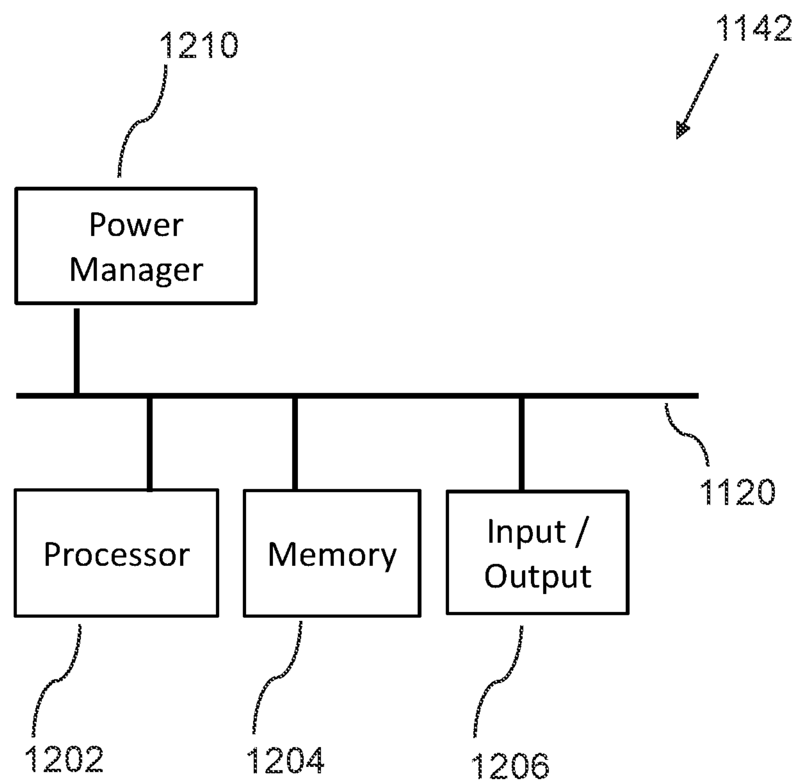
FIG. 12 is a schematic diagram illustrating an aircraft control unit, according to an embodiment of the invention.

In a related embodiment, as shown in FIG. 12 the aircraft control unit 1142 can further include:

a) a processor 1202;

b) a non-transitory memory 1204;

c) an input/output component 1206; and d) a power manager 1210 (that can also be referred to as a flight manager 1210), which is configured to control the specific power applied for each corresponding motor 214 in each of the right and left dual-state rotatable propulsion systems 110, 310, 510, 610; all connected via e) a data bus 1220.

In related embodiments, the power manager 1210 can execute flight control software that is loaded into memory 1204, and the aircraft control unit 1142 can further include (or communicate with) flight control/avionic systems/components such as accelerometers, gyros, barometer, GPS, etc. As shown in FIG. 1C, the dual-state propulsion aircraft 100 can further include rotary position sensors, such as hall effect sensors to determine the position the nacelles, which can be positioned between the wings and dual-state rotatable propulsion systems 110, 310, 510, 610. The dual-state rotatable propulsion systems 110, 310, 510, 610 can further include inertial measurement unit (IMU) sensors 390 (as shown in FIG. 3A) for determining the position of the dual-state rotatable propulsion systems 110, 310, 510, 610. The control unit 1142 can further include an IMU sensor for determining the position of the main body. The dual-state rotatable propulsion systems 110 may take commands from the control unit 1142, or in the case of a remotely controlled aircraft they may take commands directly from a remote-control device 180. Rotary position sensors, or IMUs, or both may be used to determine dual-state rotatable propulsion system 110, 310, 510, 610 position. In a further related embodiment, the power manager 1210 can be configured to calculate and control position of the dual-state rotatable propulsion system 110, 310, 510, 610 and thrust output for each motor 214 in the dual-state rotatable propulsion system 110, 310, 510, 610, via an IMU/position sensor attached to the rotatable shaft 303, eliminating the requirement to have such sensors located within the dual-state rotatable propulsion system 110, 310, 510, 610 itself.

FIGS. 1A, 11, and 12 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1A, 11, and 12 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of aircraft control unit 1142 are to be interpreted in the most general manner.

For example, the processor 1202 can include a single physical microprocessor or microcontroller, a cluster of processors, a datacenter or a cluster of datacenters, a computing cloud service, and the like.

In a further example, the non-transitory memory 1204 can include various forms of non-transitory storage media, including random access memory and other forms of dynamic storage, and hard disks, hard disk clusters, cloud storage services, and other forms of long-term storage. Similarly, the input/output 1206 can include a plurality of well-known input/output devices, such as screens, keyboards, pointing devices, motion trackers, communication ports, and so forth.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In various related embodiment, as shown in FIGS. 1A, 11, and 12, components of the aircraft control unit 1142 can include:

a) Software modules 1210, which can include the power manager 1210;
   wherein the software modules 1210 can be defined by computer program instructions for execution by a processor 1102. In some embodiments, parts or all of the software modules 1210 can be compiled to hardware, such as field-programmable gate array circuits or other programmable logic hardware; and b) Hardware components 1202, 1204, 1206, which can for example include a processor 1202, a non-transitory memory 1204, an input/output component 1206, etc.;
   wherein the Hardware components 1202, 1204, 1206 can be defined by circuits in silicone and/or other materials and can be mounted on a circuit board. In some embodiment, parts of the Hardware components 1202, 1204, 1206 can be implemented as computer program instructions, including operating system code, such as BIOS code or microcode of programmable controllers.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the . . . device, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A dual-state propulsion aircraft, comprising:

a) an aircraft fuselage; and b) at least one dual-state propulsion system, which comprises:

a fixed nacelle, which is connected to the aircraft fuselage;

a rotatable nacelle, which is rotatably connected to the fixed nacelle;

a motor, which is connected to the rotatable nacelle, wherein the motor comprises a rotatable motor shaft, such that a motor shaft axis of the rotatable motor shaft is configured with a motor deviation angle between a nacelle pivot axis of the rotatable nacelle and the motor shaft axis in a range of 5-85 degrees; and a thruster, which is connected to an outer end of the rotatable motor shaft;

such that the at least one dual-state propulsion system is rotatable to a first system position configured for vertical flight, such that a first shaft rotational direction causes a first direction nacelle counterrotation of the rotatable nacelle to a first nacelle position corresponding to the first system position, wherein the first direction nacelle counterrotation is induced by a first propeller torque of the thruster, wherein the first direction nacelle counterrotation is enabled by the motor deviation angle;

such that the at least one dual-state propulsion system is rotatable to a second system position configured for horizontal flight, such that a reversal of the first shaft rotational direction to a second shaft rotational direction causes a second direction nacelle counterrotation of the rotatable nacelle from the first nacelle position to a second nacelle position corresponding to the second system position, wherein the second direction nacelle counterrotation is induced by a second propeller torque of the thruster, wherein the second direction nacelle counterrotation is enabled by the motor deviation angle.

2. The dual-state propulsion aircraft of claim 1, wherein the nacelle pivot axis of the rotatable nacelle is configured with a nacelle deviation angle between a horizontal flight direction and the nacelle pivot axis, wherein the nacelle deviation angle is in a range of 5-85 degrees, and wherein the motor deviation angle is 90 degrees minus the nacelle deviation angle;

wherein the motor shaft axis is parallel to a vertical flight direction when the at least one dual-state propulsion system is in the first system position; and wherein the motor shaft axis is parallel to a horizontal flight direction when the at least one dual-state propulsion system is in the second system position.

3. The dual-state propulsion aircraft of claim 1, wherein the motor deviation angle is 45 degrees.

4. The dual-state propulsion aircraft of claim 1, wherein a nacelle rotational span between the first nacelle position and the second nacelle position is 180 degrees.

5. The dual-state propulsion aircraft of claim 1, wherein the at least one dual-state propulsion system further comprises:

a nacelle axle, which is connected between the fixed nacelle and the rotatable nacelle.

6. The dual-state propulsion aircraft of claim 1, wherein the fixed nacelle comprises:

a) a front curved section; and b) a rear straight section;

such that a connection angle between the front curved section and the rear straight section is configured to be 90 degrees minus the motor deviation angle.

7. The dual-state propulsion aircraft of claim 1, wherein the fixed nacelle comprises:

a) a front straight tubular section, which is configured with a rear angled sectional cut; and b) a rear straight tubular section, which is configured with a front angled sectional cut, which matches the rear angled sectional cut;

such that the nacelle pivot axis is perpendicular to each of the front angled sectional cut and the rear angled sectional cut.

8. The dual-state propulsion aircraft of claim 1, wherein the at least one dual-state propulsion system further comprises:

a) a first mechanical stop, which is configured to stop the rotatable nacelle when the rotatable nacelle is in the first nacelle position; and b) a second mechanical stop, which is configured to stop the rotatable nacelle when the rotatable nacelle is in the second nacelle position;

such that the first mechanical stop and the second mechanical stop are configured to allow a nacelle rotation between the first nacelle position and the second nacelle position.

9. The dual-state propulsion aircraft of claim 8, wherein the at least one dual-state propulsion system further comprises:

an intermediate flange, which is connected to a side surface of a rear end of the rotatable nacelle, such that the intermediate flange protrudes to a rear of the rear end of the rotatable nacelle;

wherein the first mechanical stop is configured as a first flange, which is connected to a first side surface of a front end of the fixed nacelle, such that the first flange protrudes to a front of the front end of the fixed nacelle; and wherein the second mechanical stop is configured as a second flange, which is connected to a second side surface of the front end of the fixed nacelle, such that the second flange protrudes to the front of the front end of the fixed nacelle;

such that the intermediate flange impacts with the first flange when the rotatable nacelle is in the first nacelle position; and such that the intermediate flange impacts with the second flange when the rotatable nacelle is in the second nacelle position.

10. The dual-state propulsion aircraft of claim 1, wherein the thruster of the at least one dual-state propulsion system further comprises:

a) a central hub, which is rotatably connected to a front end of the rotatable motor shaft, such that the rotatable motor shaft is configured to be freely rotatable between a first shaft position and a second shaft position, relative to the central hub; and b) a first thruster blade, which is pivotably connected to the central hub, such that a blade pitch axis of the first thruster blade is perpendicular to a shaft axis of the rotatable motor shaft, such that the first thruster blade is configured to be pivotable between a first pitch position and a second pitch position, corresponding to a free rotation of the rotatable motor shaft between the first shaft position and the second shaft position;

such that a first shaft rotation of the rotatable motor shaft in the first shaft rotational direction causes a pivoting of the first thruster blade in a first pitch direction until the first thruster blade reaches the first pitch position, wherein the rotatable motor shaft engages with the central hub and causes a rotation of the thruster in the first shaft rotational direction; and such that a reversal from the first shaft rotation to a second shaft rotation of the rotatable motor shaft in the second shaft rotational direction causes a second pivoting of the first thruster blade in a second pitch direction until the first thruster blade reaches the second pitch position, wherein the rotatable motor shaft engages with the central hub and causes a rotation of the thruster in the second shaft rotational direction.

11. The dual-state propulsion aircraft of claim 10, wherein the central hub further comprises:

a) a central hub member, which comprises a first outer aperture;

b) a first thruster gear assembly, comprising:

a first thruster gear, comprising first thruster teeth; and a first thruster axle, which is connected to an inner center of the first thruster gear, such that the first thruster axle is rotatably connected in the first outer aperture of the central hub member;

such that the first thruster gear is connected to an inner end of the first thruster blade, such that a first gear axis of the first thruster gear is coincident with the blade pitch axis; and c) a shaft gear, which is connected around the rotatable motor shaft, such that a shaft gear axis of the shaft gear is coincident with the motor shaft axis;

such that the first thruster gear is in intermeshing contact with the shaft gear.

12. The dual-state propulsion aircraft of claim 11, wherein the central hub member, further comprises:

a) a longitudinal aperture, such that the rotatable motor shaft protrudes through the longitudinal aperture;

b) a first shaft mechanical stop member which protrudes on a first outer side of the longitudinal aperture; and c) a second shaft mechanical stop member which protrudes on a second outer side of the longitudinal aperture; and wherein the thruster further comprises:

an intermediate shaft mechanical stop member, which is connected to an outer end of the rotatable motor shaft, such that the intermediate shaft mechanical stop member protrudes laterally from the rotatable motor shaft;

such that the intermediate shaft mechanical stop member is configured to impact with the first shaft mechanical stop member when the first thruster blade is in the first pitch position; and such that the intermediate shaft mechanical stop member is configured to impact with the second shaft mechanical stop member when the first thruster blade is in the second pitch position.

13. The dual-state propulsion aircraft of claim 11, wherein the central hub member, further comprises a second outer aperture; and wherein the thruster of the at least one dual-state propulsion system further comprises:

a) a second thruster blade, which is pivotably connected to the central hub in a symmetrically opposing orientation relative to the first thruster blade; and b) a second thruster gear assembly, comprising:

a second thruster gear, comprising second thruster teeth; and a second thruster axle, which is connected to an inner center of the second thruster gear, such that the second thruster axle is rotatably connected in the second outer aperture of the central hub member;

such that the second thruster gear is connected to an inner end of the second thruster blade, such that a second gear axis of the second thruster gear is coincident with the blade pitch axis; and such that the second thruster gear is in intermeshing contact with the shaft gear.

14. The dual-state propulsion aircraft of claim 1, wherein the dual-state propulsion aircraft is configured as a rotary wing aircraft, and wherein the dual-state propulsion system is connected to a rear of the aircraft fuselage to function as an anti-torque device, such that the dual-state propulsion system is reorientable during forward flight to provide forward propulsion.

15. The dual-state propulsion aircraft of claim 1, wherein the at least one dual-state propulsion system comprises a propulsion layout, which comprises:

a) two front-mounted dual-state propulsion systems; and b) two rear-mounted dual-state propulsion systems, which are mounted with a smaller separation distance than a larger separation distance of the front-mounted dual-state propulsion systems;

such that the propulsion layout allows one of the two rear-mounted dual-state propulsion systems to be powered off or reoriented without losing pitch or roll stability.

16. A dual-state propulsion system for mounting on an aircraft, comprising:

a) a fixed nacelle;

b) a rotatable nacelle, which is rotatably connected to the fixed nacelle; and c) a motor, which is connected to the rotatable nacelle, wherein the motor comprises a rotatable motor shaft, such that a motor shaft axis of the rotatable motor shaft is configured with a motor deviation angle between a nacelle pivot axis of the rotatable nacelle and the motor shaft axis in a range of 5-85 degrees;

d) a thruster, which is connected to an outer end of the rotatable motor shaft;

such that the dual-state propulsion system is rotatable to a first system position configured for vertical flight, such that a first shaft rotational direction causes a first direction nacelle counterrotation of the rotatable nacelle to a first nacelle position corresponding to the first system position, wherein the first direction nacelle counterrotation is induced by a first propeller torque of the thruster, wherein the first direction nacelle counterrotation is enabled by the motor deviation angle;

such that the dual-state propulsion system is rotatable to a second system position configured for horizontal flight, such that a reversal of the first shaft rotational direction to a second shaft rotational direction causes a second direction nacelle counterrotation of the rotatable nacelle from the first nacelle position to a second nacelle position corresponding to the second system position, wherein the second direction nacelle counterrotation is induced by a second propeller torque of the thruster, wherein the second direction nacelle counterrotation is enabled by the motor deviation angle.

17. The dual-state propulsion system of claim 16, wherein the dual-state propulsion system further comprises:

a nacelle axle, which is connected between the fixed nacelle and the rotatable nacelle.

18. The dual-state propulsion system of claim 16, wherein the fixed nacelle comprises:

a) a front curved section; and b) a rear straight section;

such that a connection angle between the front curved section and the rear straight section is configured to be 90 degrees minus the motor deviation angle.

19. The dual-state propulsion system of claim 16, wherein the fixed nacelle comprises:

a) a front straight tubular section, which is configured with a rear angled sectional cut; and b) a rear straight tubular section, which is configured with a front angled sectional cut, which matches the rear angled sectional cut;

such that the nacelle pivot axis is perpendicular to each of the front angled sectional cut and the rear angled sectional cut.

20. The dual-state propulsion system of claim 16, wherein the dual-state propulsion system further comprises:

a) a first mechanical stop, which is configured to stop the rotatable nacelle when the rotatable nacelle is in the first nacelle position; and b) a second mechanical stop, which is configured to stop the rotatable nacelle when the rotatable nacelle is in the second nacelle position;

such that the first mechanical stop and the second mechanical stop are configured to allow a nacelle rotation between the first nacelle position and the second nacelle position.

21. The dual-state propulsion system of claim 20, wherein the dual-state propulsion system further comprises:

an intermediate flange, which is connected to a side surface of a rear end of the rotatable nacelle, such that the intermediate flange protrudes to a rear of the rear end of the rotatable nacelle;

wherein the first mechanical stop is configured as a first flange, which is connected to a first side surface of a front end of the fixed nacelle, such that the first flange protrudes to a front of the front end of the fixed nacelle; and wherein the second mechanical stop is configured as a second flange, which is connected to a second side surface of the front end of the fixed nacelle, such that the second flange protrudes to the front of the front end of the fixed nacelle;

such that the intermediate flange impacts with the first flange when the rotatable nacelle is in the first nacelle position; and such that the intermediate flange impacts with the second flange when the rotatable nacelle is in the second nacelle position.

22. The dual-state propulsion system of claim 16, wherein the thruster of the dual-state propulsion system further comprises:

a) a central hub, which is rotatably connected to a front end of the rotatable motor shaft, such that the rotatable motor shaft is configured to be freely rotatable between a first shaft position and a second shaft position, relative to the central hub; and b) a first thruster blade, which is pivotably connected to the central hub, such that a blade pitch axis of the first thruster blade is perpendicular to a shaft axis of the rotatable motor shaft, such that the first thruster blade is configured to be pivotable between a first pitch position and a second pitch position, corresponding to a free rotation of the rotatable motor shaft between the first shaft position and the second shaft position;

such that a first shaft rotation of the rotatable motor shaft in the first shaft rotational direction causes a pivoting of the first thruster blade in a first pitch direction until the first thruster blade reaches the first pitch position, wherein the rotatable motor shaft engages with the central hub and causes a rotation of the thruster in the first shaft rotational direction; and such that a reversal from the first shaft rotation to a second shaft rotation of the rotatable motor shaft in the second shaft rotational direction causes a second pivoting of the first thruster blade in a second pitch direction until the first thruster blade reaches the second pitch position, wherein the rotatable motor shaft engages with the central hub and causes a rotation of the thruster in the second shaft rotational direction.

23. The dual-state propulsion system of claim 22, wherein the central hub further comprises:

a) a central hub member, which comprises a first outer aperture;

b) a first thruster gear assembly, comprising:

a first thruster gear, comprising first thruster teeth; and a first thruster axle, which is connected to an inner center of the first thruster gear, such that the first thruster axle is rotatably connected in the first outer aperture of the central hub member;

such that the first thruster gear is connected to an inner end of the first thruster blade, such that a first gear axis of the first thruster gear is coincident with the blade pitch axis; and c) a shaft gear, which is connected around the rotatable motor shaft, such that a shaft gear axis of the shaft gear is coincident with the motor shaft axis;

such that the first thruster gear is in intermeshing contact with the shaft gear.

24. The dual-state propulsion system of claim 23, wherein the central hub member, further comprises:

a) a longitudinal aperture, such that the rotatable motor shaft protrudes through the longitudinal aperture;

b) a first shaft mechanical stop member which protrudes on a first outer side of the longitudinal aperture; and c) a second shaft mechanical stop member which protrudes on a second outer side of the longitudinal aperture; and wherein the thruster further comprises:

an intermediate shaft mechanical stop member, which is connected to an outer end of the rotatable motor shaft, such that the intermediate shaft mechanical stop member protrudes laterally from the rotatable motor shaft;

such that the intermediate shaft mechanical stop member is configured to impact with the first shaft mechanical stop member when the first thruster blade is in the first pitch position; and such that the intermediate shaft mechanical stop member is configured to impact with the second shaft mechanical stop member when the first thruster blade is in the second pitch position.

25. The dual-state propulsion system of claim 23, wherein the central hub member, further comprises a second outer aperture; and wherein the thruster of the dual-state propulsion system further comprises:

a) a second thruster blade, which is pivotably connected to the central hub in a symmetrically opposing orientation relative to the first thruster blade; and b) a second thruster gear assembly, comprising:

a second thruster gear, comprising second thruster teeth; and a second thruster axle, which is connected to an inner center of the second thruster gear, such that the second thruster axle is rotatably connected in the second outer aperture of the central hub member;

such that the second thruster gear is connected to an inner end of the second thruster blade, such that a second gear axis of the second thruster gear is coincident with the blade pitch axis; and such that the second thruster gear is in intermeshing contact with the shaft gear.

26. A dual-state propulsion system, comprising a thruster and a motor, which comprises a rotatable motor shaft, wherein the thruster comprises:

a) a central hub, which is rotatably connected to a front end of the rotatable motor shaft, such that the rotatable motor shaft is configured to be freely rotatable between a first shaft position and a second shaft position, relative to the central hub; and b) a first thruster blade, which is pivotably connected to the central hub, such that a blade pitch axis of the first thruster blade is perpendicular to a shaft axis of the rotatable motor shaft, such that the first thruster blade is configured to be pivotable between a first pitch position and a second pitch position, corresponding to a free rotation of the rotatable motor shaft between the first shaft position and the second shaft position;

such that a first shaft rotation of the rotatable motor shaft in a first shaft rotational direction causes a pivoting of the first thruster blade in a first pitch direction until the first thruster blade reaches the first pitch position, wherein the rotatable motor shaft engages with the central hub and causes a rotation of the thruster in the first shaft rotational direction; and such that a reversal from the first shaft rotation to a second shaft rotation of the rotatable motor shaft in a second shaft rotational direction causes a second pivoting of the first thruster blade in a second pitch direction until the first thruster blade reaches the second pitch position, wherein the rotatable motor shaft engages with the central hub and causes a rotation of the thruster in the second shaft rotational direction.

27. The dual-state propulsion system of claim 26, wherein the central hub further comprises:

a) a central hub member, which comprises a first outer aperture;

b) a first thruster gear assembly, comprising:

a first thruster gear, comprising first thruster teeth; and a first thruster axle, which is connected to an inner center of the first thruster gear, such that the first thruster axle is rotatably connected in the first outer aperture of the central hub member;

such that the first thruster gear is connected to an inner end of the first thruster blade, such that a first gear axis of the first thruster gear is coincident with the blade pitch axis; and c) a shaft gear, which is connected around the rotatable motor shaft, such that a shaft gear axis of the shaft gear is coincident with a motor shaft axis of the rotatable motor shaft;

such that the first thruster gear is in intermeshing contact with the shaft gear.

28. The dual-state propulsion system of claim 27, wherein the central hub member, further comprises:

a) a longitudinal aperture, such that the rotatable motor shaft protrudes through the longitudinal aperture;

b) a first shaft mechanical stop member which protrudes on a first outer side of the longitudinal aperture; and c) a second shaft mechanical stop member which protrudes on a second outer side of the longitudinal aperture; and wherein the thruster further comprises:

an intermediate shaft mechanical stop member, which is connected to an outer end of the rotatable motor shaft, such that the intermediate shaft mechanical stop member protrudes laterally from the rotatable motor shaft;

such that the intermediate shaft mechanical stop member is configured to impact with the first shaft mechanical stop member when the first thruster blade is in the first pitch position; and such that the intermediate shaft mechanical stop member is configured to impact with the second shaft mechanical stop member when the first thruster blade is in the second pitch position.

29. The dual-state propulsion system of claim 27, wherein the central hub member, further comprises a second outer aperture; and wherein the thruster of the dual-state propulsion system further comprises:

a) a second thruster blade, which is pivotably connected to the central hub in a symmetrically opposing orientation relative to the first thruster blade; and b) a second thruster gear assembly, comprising:

a second thruster gear, comprising second thruster teeth; and a second thruster axle, which is connected to an inner center of the second thruster gear, such that the second thruster axle is rotatably connected in the second outer aperture of the central hub member;

such that the second thruster gear is connected to an inner end of the second thruster blade, such that a second gear axis of the second thruster gear is coincident with the blade pitch axis; and such that the second thruster gear is in intermeshing contact with the shaft gear.

30. The dual-state propulsion system of claim 29, wherein the first thruster gear, the second thruster gear, and the shaft gear are each configured as a bevel gear.

* * * * *